May 5, 1964  H. A. ANDERSON ETAL  3,131,627
HIGH SPEED SERIAL PRINTER
Filed March 30, 1961  15 Sheets-Sheet 1

INVENTOR.
Hilding A. Anderson
Robert S. Wenman
BY
*Strauch Nolan & Neale*
ATTORNEYS

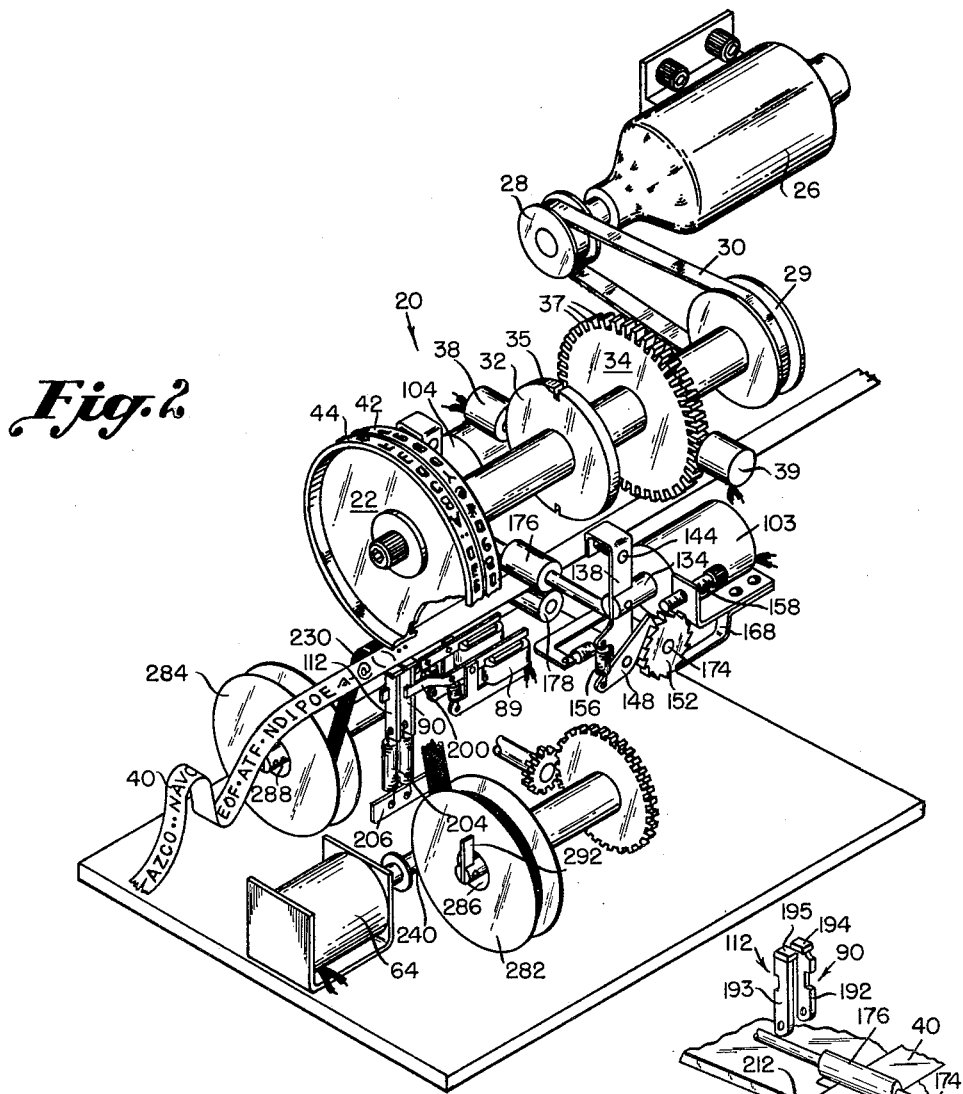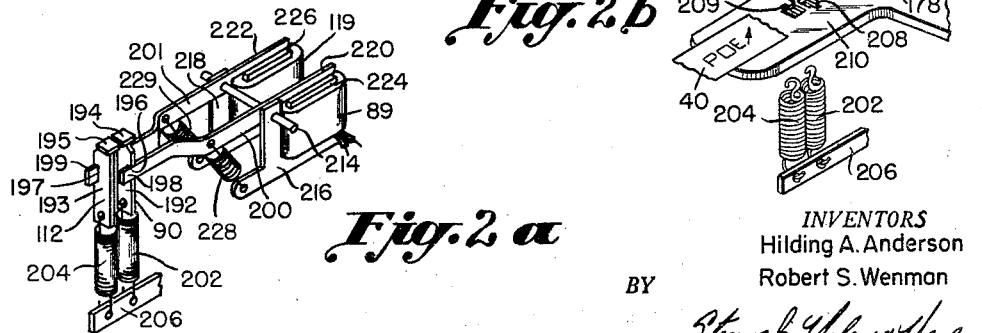

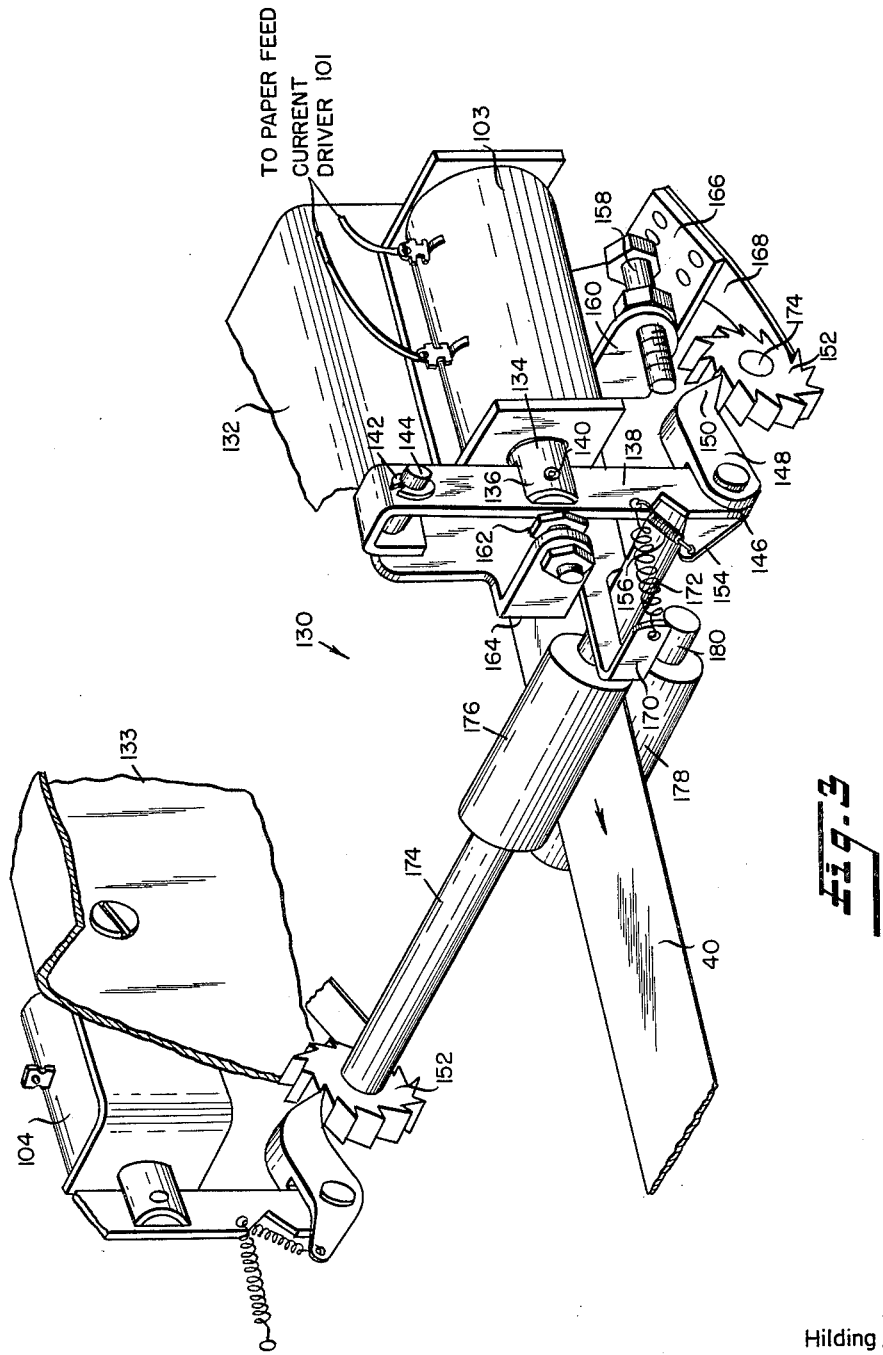

*INVENTORS*
Hilding A. Anderson
Robert S. Wenman

BY

*ATTORNEYS*

May 5, 1964  H. A. ANDERSON ETAL  3,131,627
HIGH SPEED SERIAL PRINTER
Filed March 30, 1961  15 Sheets-Sheet 5
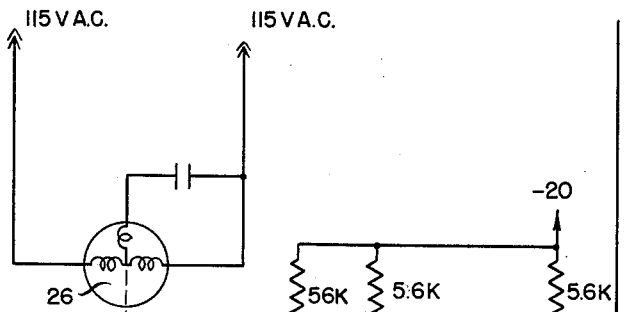
Fig. 7
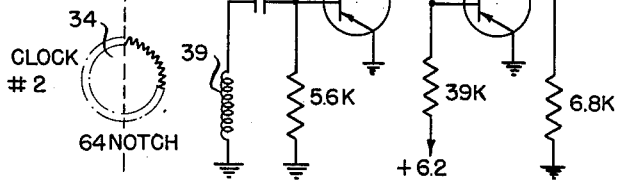
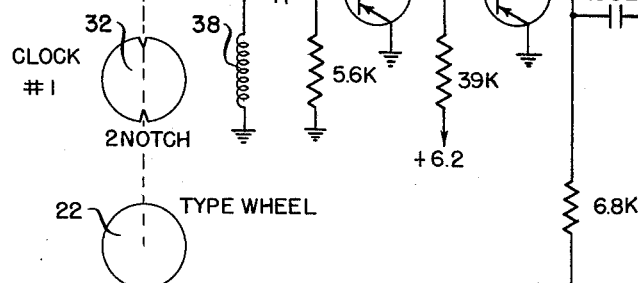
Fig. 7A
SYMBOL
→▷→
AMPLIFIER
INVENTORS
Hilding A. Anderson
Robert S. Wenman
BY *Strauch, Nolan & Neale*
ATTORNEYS

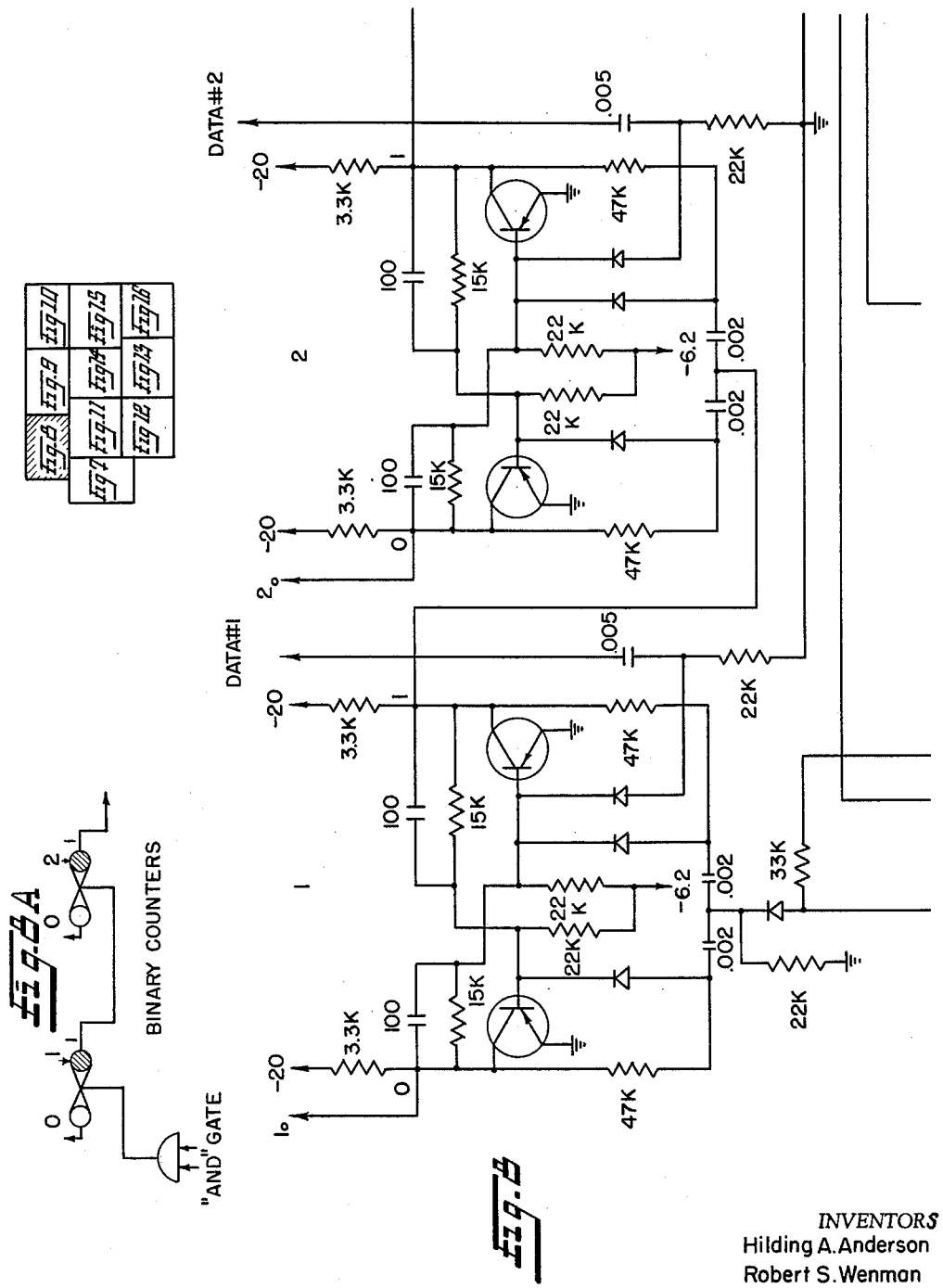

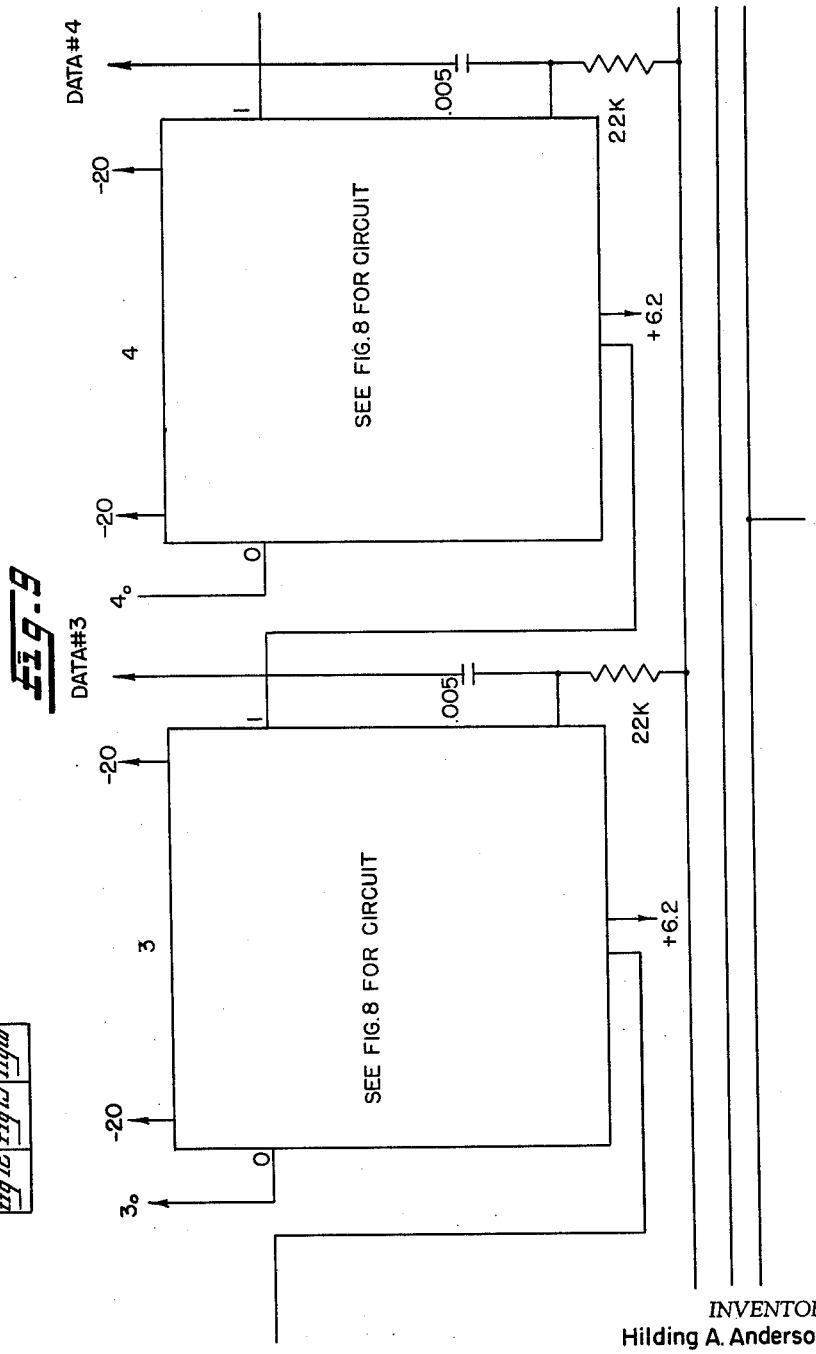

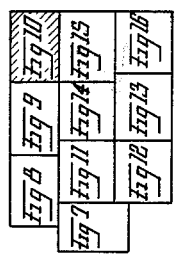
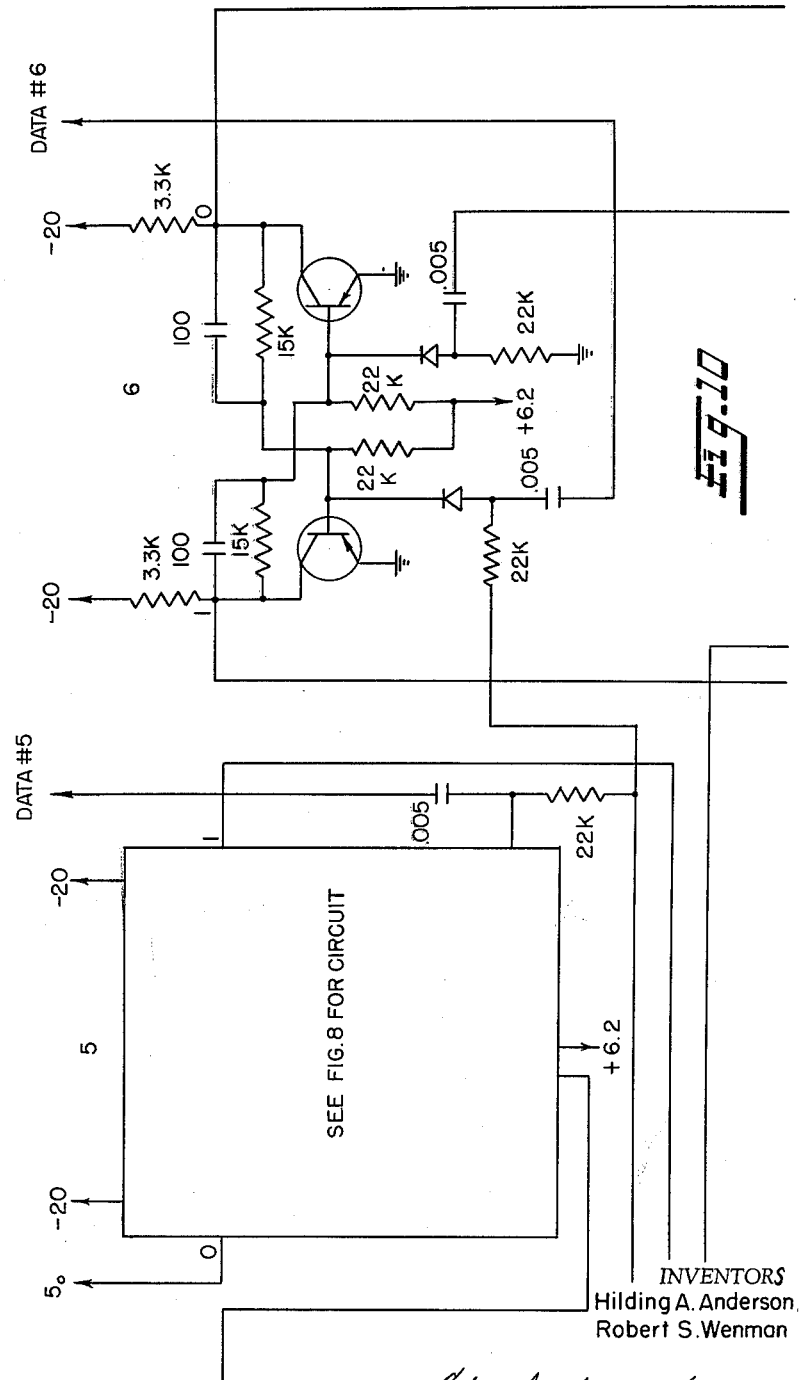

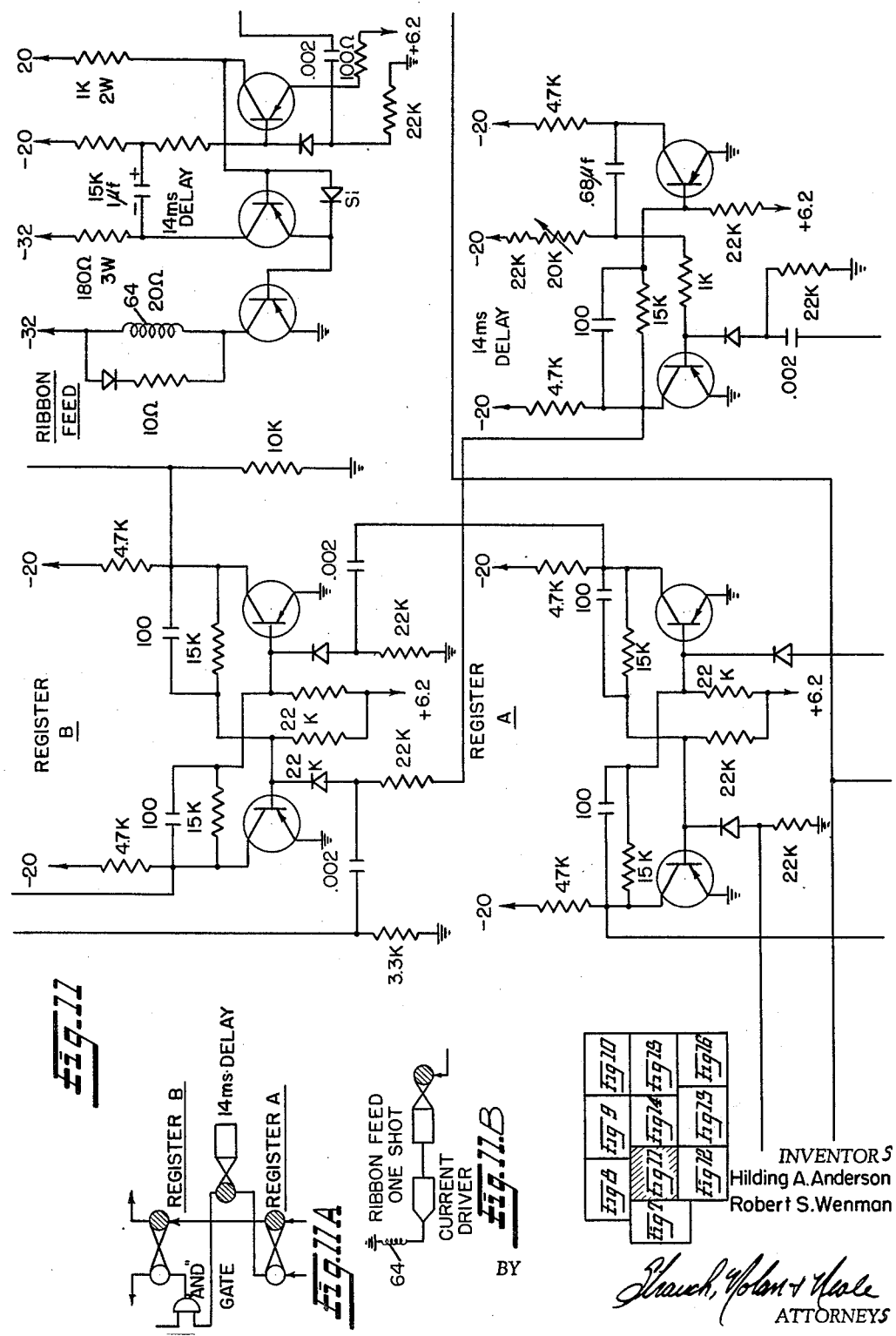

May 5, 1964  H. A. ANDERSON ETAL  3,131,627
HIGH SPEED SERIAL PRINTER
Filed March 30, 1961                       15 Sheets-Sheet 11
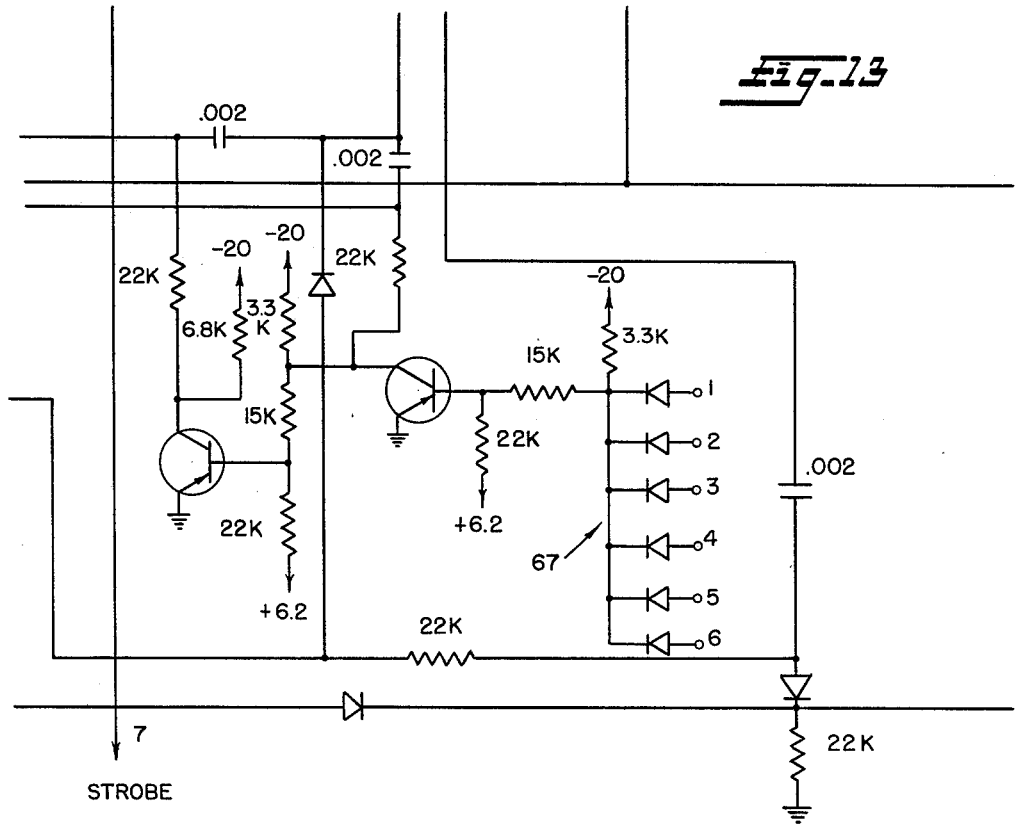
Fig. 13
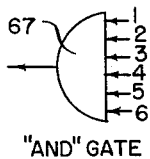
Fig. 13A
"AND" GATE
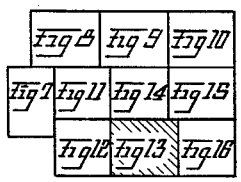
INVENTORS
Hilding A. Anderson
Robert S. Wenman
BY *Strauch, Nolan + Neale*
ATTORNEYS May 5, 1964  H. A. ANDERSON ETAL  3,131,627
HIGH SPEED SERIAL PRINTER
Filed March 30, 1961  15 Sheets-Sheet 12

÷2 RIBBON CONTROL

INVENTORS
Hilding A. Anderson
Robert S. Wenman
BY
ATTORNEYS

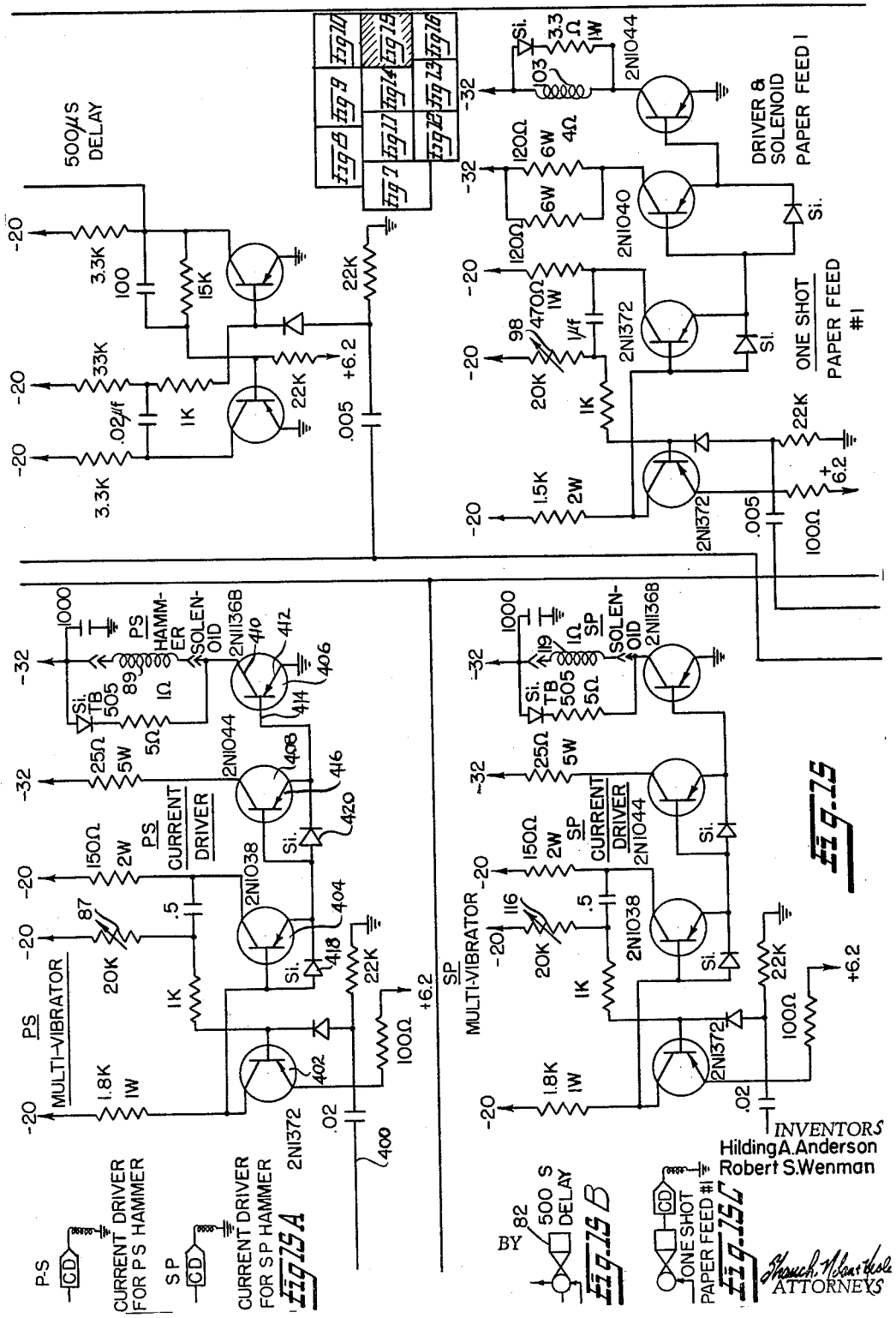

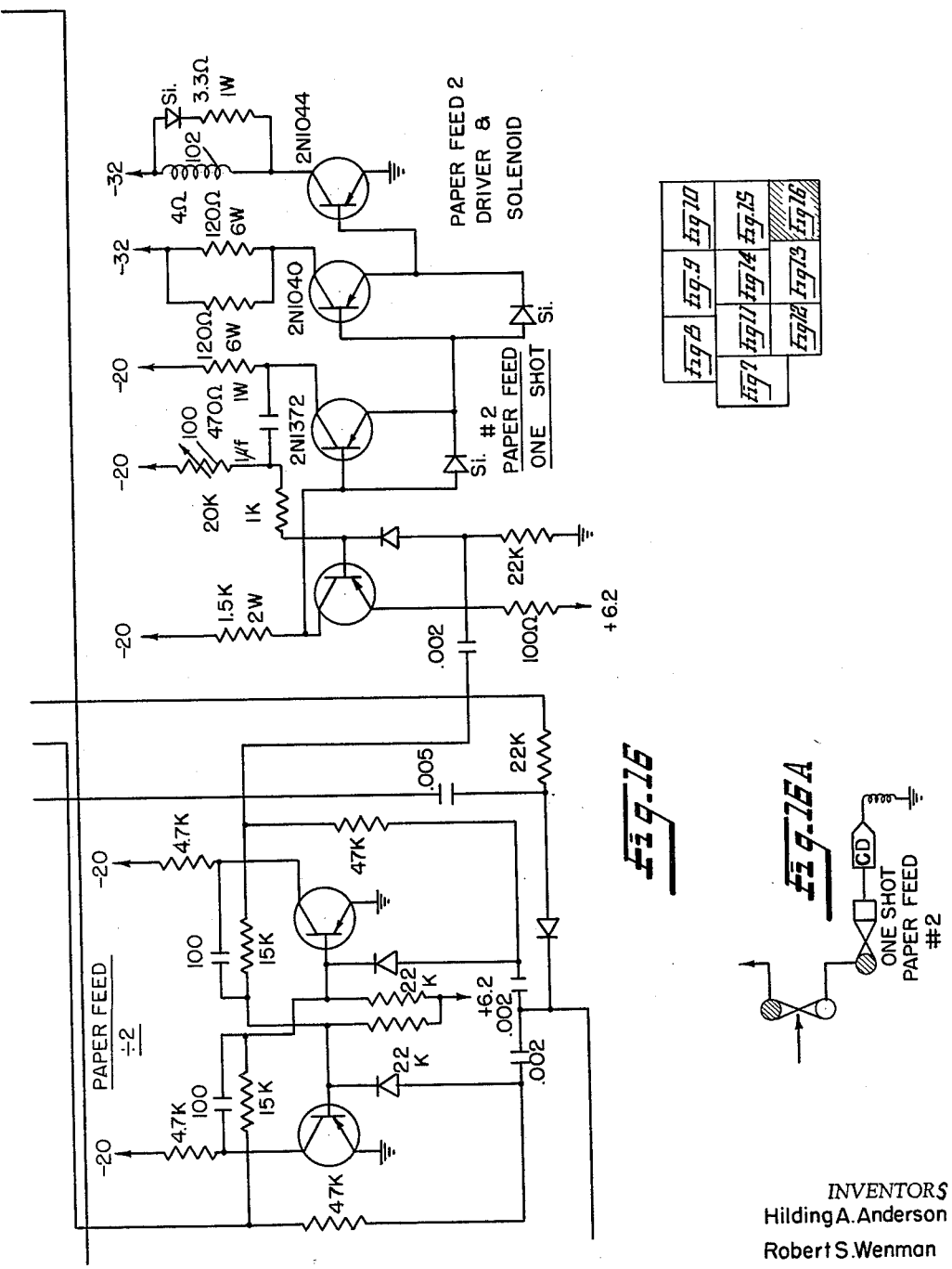

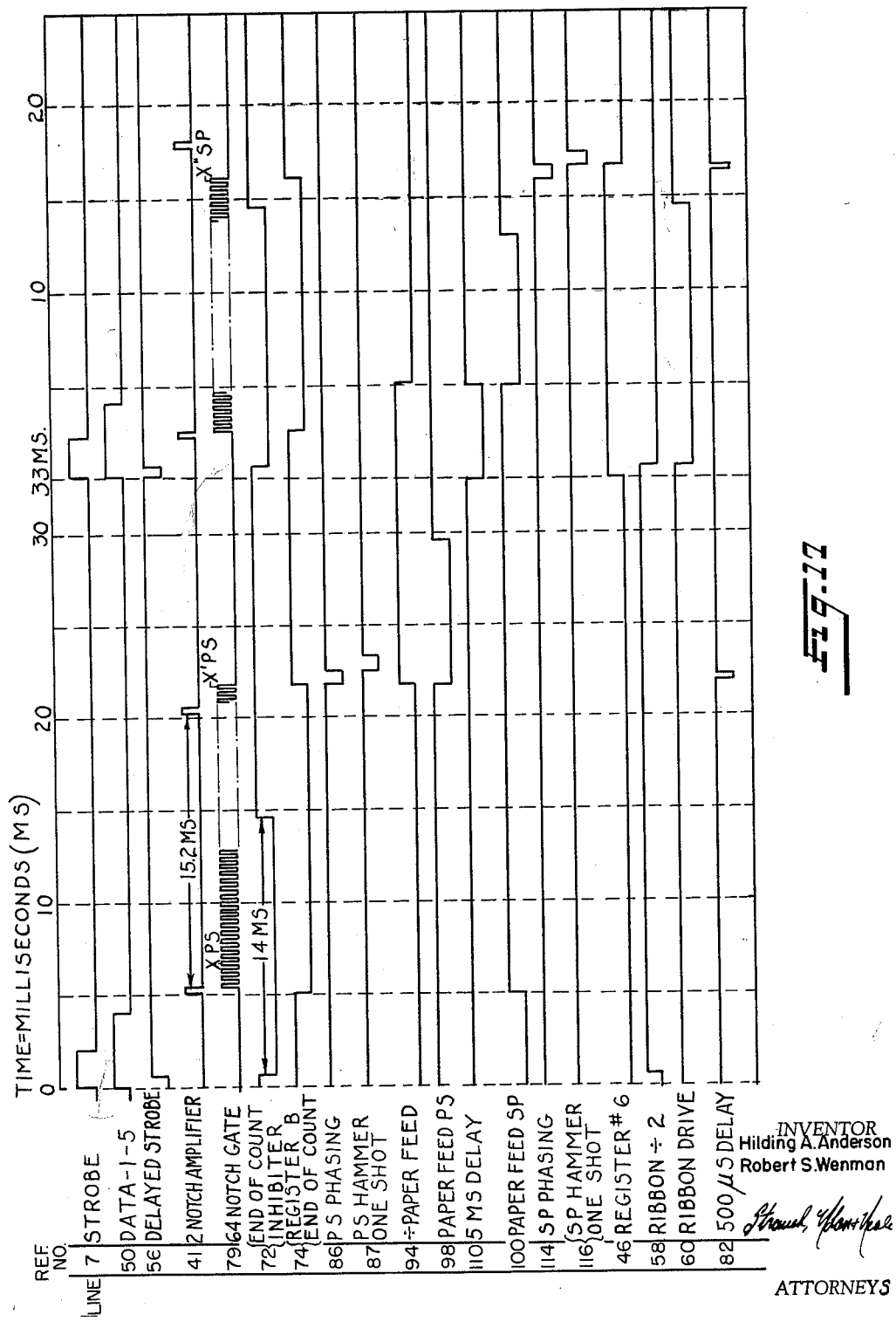

United States Patent Office 3,131,627
Patented May 5, 1964

3,131,627
HIGH SPEED SERIAL PRINTER
Hilding A. Anderson and Robert S. Wenman, Lake Zurich, Ill., assignors to SCM Corporation, a corporation of New York
Filed Mar. 30, 1961, Ser. No. 103,183
33 Claims. (Cl. 101—93)

This invention relates to a printing device and more particularly to a high speed printing apparatus designed to print a message, coded or otherwise, on a tape, said message being received as electrical code signals which originate in a telegraphic or data processing system or other similar telegraphic mediums.

The invention uses, as a basic principle of operation, electronic selection of actuation of a desired one of two print hammers which are aligned to print a serial message on a tape from two rows of characters positioned around the periphery of a continuously rotating typewheel.

In rotating typewheel printers some arrangement is required to determine when the desired typeface on the wheel is in a position to be printed at the printing station. Many conventional rotary typewheel printers stop the wheel at a printing station when the wheel position detector provides a signal which matches or coincides with the received code signal. In recent years, as the need for higher speed printers has become urgent, printing "on the fly" or printing without stopping the rotation of the typewheel has come into prominence, particularly in connection with printing computor output information delivered at high output rates. The basic need for typewheel position detection and matching with the received code of a desired character (or operation, e.g., "space") to be printed is still present, and can be accomplished by signals from electrical commutators on the rotating shaft or from some form of impulse transducer such as photocell impulse transducers or electromagnetic impulse transducers. Such transducers are preferred for high speed operations because the position detection impulses are derived without engagement of moving parts.

The present invention in its exemplary embodiment utilizes an electromagnetic impulse transducer form of typewheel position detector where a pulse is generated for each typewheel position starting from an indexing point (or points) and the pulse counts compared with an incoming code signal in an electronic counter to determine the typewheel position. Print hammer actuation is then controlled relative to instantaneous shaft position to record any desired character. An early teaching of such an electromagnetic pulse transducing position detector with electronic counter for matching shaft and typewheel position with printing actuation may be seen in Patent No. 2,627,224 to Wolf, and a more recent and more refined version may be seen in U.S. Patent Nos. 2,938,193 and 2,954,731 (the latter two, however, being primarily concerned with multiple rows of typewheels for page printing). It is to be understood that the required shaft position impulses may be obtained in other known ways such as by photocells with a perforated clock disc and a light source. The mode of the printer operation of the present invention could also be applicable to relatively low speed printers where shaft position impulses can be obtained by brushes and commutators although the electromagnetic impulse transducer is the preferred and the least expensive construction.

Very briefly, the tape printer of the present invention uses two rows of type characters, each type row having its associated print hammer, and a dual tape stepping mechanism which is associated, through control apparatus, for specific different modes of operation with each specific print hammer. Whichever row of characters includes the character selected for printing, printing will occur at the next print position on the tape. This is accomplished by utilizing two basic modes of machine operation, termed "PRINT FIRST—THEN SPACE" (for characters in typewheel row #1) and "SPACE FIRST—THEN PRINT" (for characters in typewheel row #2). The appropriate mode of operation is automatically determined by the machine upon receipt of the appropriate character signal (the signal being coded according to desired typewheel row). Two additional modes of operation, essentially functional, are also provided: a "SPACE—NO PRINT" mode and a "MANUAL TAPE FEED-OUT" mode.

In a tape printer, a factor affecting speed of operation is one of tape feed. This invention provides two separate tape feed mechanisms which are operated alternately to effectively double the available mechanical speed of tape feed.

Accordingly, a principal object of this invention resides in the provision of a novel electromechanical tape printer capable of operating at very high speeds (300-400 words per minute).

Another object resides in the provision of a novel typewheel serial printer having comparatively few mechanical parts, relying mainly on electronic circuitry, thereby greatly increasing the speed of operation.

A further object resides in the provision of a novel printer capable of detecting a print or no-print condition in a received code and being capable of inhibiting or carrying out these functions completely through electronic circuitry control over the mechanical printer components.

In conjunction with the foregoing object, a further object of this invention resides in provision of a novel typewheel tape printer with electronic circuitry for receiving coded signal information and controlling mechanical print functions and mechanical tape space function electronically with at least two distinct modes of mechanically related operation of the printing and spacing mechanisms, and electronic means to inhibit (or bypass) the electronic print control but not the electronic tape feed control whenever the received signals are space signals or whenever manual tape feed is initiated.

A further object resides in providing a novel two-row typewheel in a serial printing tape printer, the print characters in each typewheel row being dissimilar, novel printing mechanism associated with each typewheel row, and tape feed mechanism, the mode of operation of the tape feed mechanism and print mechanism associated with each of the typewheel rows being different as to order of occurrence and controlled by electronic control apparatus in accord with received code signals. A further object in this connection resides in providing novel electronic ribbon feed control correlated with the electronic print and space control.

Still another object of this invention resides in the novel combination of shaft position impulse counting transducers in a two-row typewheel printer, working in conjunction with electronic circuitry to count out increments of typewheel rotation and select positions of code characters on both of the two rows of the typewheel as they reach a print station, to coincide with code data entered into the electronic counter and novel control circuitry enabling recording of only the selected characters from one of the two typewheel rows.

A further object resides in the provision in a tape printer of novel multiple tape advancing mechanisms with mechanical components operating alternately (in response to successive signals received by the printer) with the object of obtaining a faster mode of operation.

Still another object resides in the provision of a tape type serial printer with a novel arrangement of multiple print hammers and respective electromechanical components working in conjunction with multiple rows of characters on a multiple rimmed typewheel.

Another object resides in the provision of a multiple stage transistor power amplifier incorporating a novel cascade bias arrangement by which the cutoff bias potential of amplifying transistor devices is derived from a common power source and carried forward stage by stage, by means of semiconductor bypass devices at each stage.

Further objects and advantages of the invention will be apparent from the following description and the appended claims taken in conjunction with the accompanying drawings showing a preferred embodiment thereof, in which:

FIGURE 2 is a fragmentary perspective view of a printer, with support structure and control circuitry deleted, illustrating the primary mechanical components, the typewheel shaft position detector clocks with transducer members and the solenoids which operate the mechanical print hammer, tape feed and ribbon feed components;

FIGURE 2a is a detail perspective view illustrating the print hammers and associated electromechanical components;

FIGURE 2b is an exploded perspective view illustrating association of the print hammers with the tape guide plate;

FIGURE 3 is an enlarged detail perspective illustrating the dual tape feed mechanism with support structure omitted for clarity;

Figure 1:
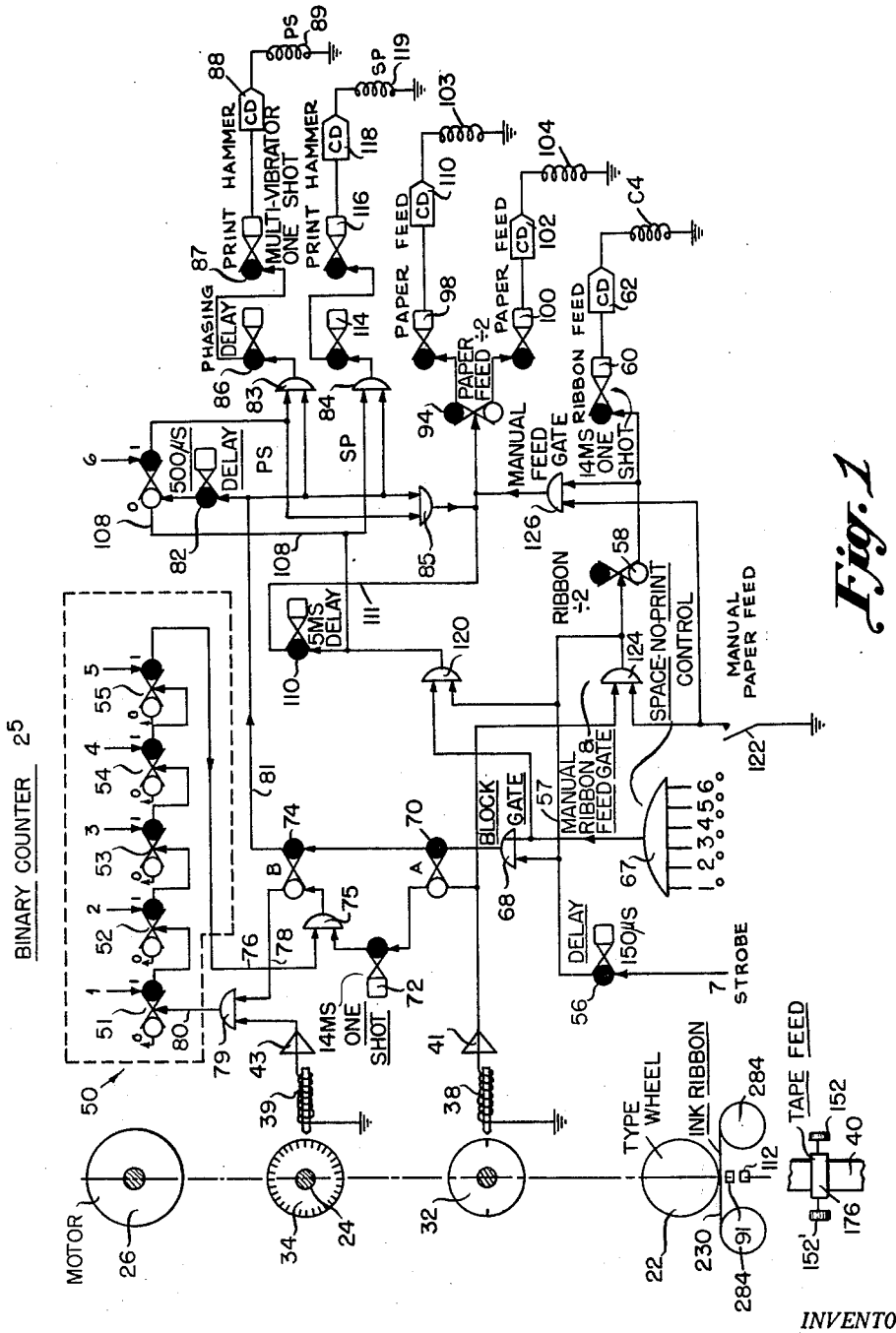
FIGURE 1 is a block diagram of a printer in accord with the present invention, the electronic control and mechanical components being illustrated by schematic symbols.

FIGURES 7–16 taken as a unit will provide a detailed circuit diagram of an exemplary transistorized printer made in accord with the present invention, a key to the placement of each figure in the overall diagram being included with each figure. The detailed components of this circuit diagram correspond to the symbolized schematic diagram of the electronic components in FIGURE 1, and representative symbolized components are included with most of the individual FIGURES 7–16 as subscripts A or A and B to enable a rapid correlation of that portion of the detailed circuit with the overall symbolized circuit of FIGURE 1. For example, FIGURE 7A is the symbol for one of the two amplifier components detailed in FIGURE 7 and FIGURES 11A and 11B are the symbols for the detailed registers, multivibrator, one-shot and current driver circuits shown in FIGURE 11; and FIGURE 17 is a timing chart which shows the time phase and cyclic relationship between circuit control functions and mechanical operations.

Although the following detailed description is of a specific printer in accordance with the present invention, it is to be understood that the invention is not restricted to the exemplary transistorized circuit components illustrated in FIGURES 7–16. Other types of circuit components and devices may be employed in the switching matrix, for example, vacuum tube switching circuits and magnetic core switches may be used. The illustrated transistorized circuit, however, does represent an operative and preferred construction of the printer. An appreciation of the compact arrangement of the complete printer can be had by realizing that it occupies approximately twice the volume of space as do the components illustrated in FIGURE 2. The complete transistorized printer with a roll of tape, ready to operate when plugged into a powerline and connected to a signal circuit, fits in a housing measuring approximately 8" x 10" x 17".

Although the complete circuit combination and some subcombination circuits are novel, inasmuch as the various components of the detailed circuit of FIGURES 7–16, such as the "and" gates, delays, one-shots, current drivers, counters, registers, etc., are known, they will not be described in detail except for the following aspects. These or equivalent circuits, of course, could utilize electron tubes, but to conserve space, power, avoid heat and obtain long life of operating components, the transistorized circuits are preferable. All of the depicted transistors in FIGURES 7–16 are 2N1372 unless otherwise indicated on the figures. All diodes are germanium D1034 unless otherwise marked. Silicon diodes are marked S1 and are SR162 unless otherwise indicated. All resistor values are noted in ohms and are ¼ watt unless marked otherwise. All capacity values are in $\mu\mu f.$ unless marked otherwise.

General Description

By preliminarily stressing several basic aspects of the printer operation, and keeping these aspects in mind, understanding of the detailed description which follows will be quite clear.

Referring for a moment to FIGURE 2, the general arrangement of the mechanical components can be seen. The drive motor 26 will best be mounted on the base structure but for convenience of illustration is shown moved to an upper location. The printer 20 has a dual row typewheel 22 which, during printer operation, is constantly rotating, being secured on a shaft 24 which is suitably journalled in the frame of the machine (not shown) and is driven by a synchronous motor 26 through pulleys 28 and 29 and a pulley belt 30. Also secured to rotate with shaft 12 is a two (2) notched clock wheel 32 and a sixty-four (64) notched clock wheel 34. The two notches 35 and 36 on clock wheel 32 are indexing points at the beginning-of-count position on the typewheel 22 while the sixty-four (64) notches 37 on clock wheel 34 are aligned with respect to the sixty-four character positions around the typewheel 22.

Clock wheels 32 and 34 are metallic discs made of high permeability magnetic material (such as wrought iron or mild steel), the notches in each, as the edges of the discs pass close to the magnetic pick-up members, causing a change in flux density in the magnetic field around the index coil 38 and impulse counting coil 39 of the pick-up members. This change in flux density induces a surge of current and a changing E.M.F. in the pick-up circuits. The voltage signal is amplified and shaped by respective amplifiers 41 and 43 (FIGURE 1) which feed the indexing and counting signals to the machine control circuits, to be hereinafter described. Clock wheels 32 and 34 must not become permanently magnetized, otherwise the machine will not work.

The machine is a serial tape printer, it prints one character or symbol or causes a space function of a message one unit at a time in a single line on a tape, the character to be printed being chosen from one or the other of the inner row 42 or the outer row 44 of the dual row typewheel 22. In the preferred embodiment, the characters in one row are different from the characters in the other row. Thirty-two different print characters or symbols can be included in each row and are repeated at 180° intervals in the same row, thus it is possible for the typewheel to contain sixty-four different characters, half in one row and half in the other row and each character will appear twice in its row at diametrically opposite positions (180°).

Still referring to FIGURE 2, a paper tape 40 feeds from right to left from a supply roll (not shown) by mechanism to be later described in detail. To aid in understanding, the inner typewheel row 42 is on the incoming tape side and the outer typewheel row 44 is on the tape feed-out side.

In order to serially print a message on the tape in this machine without overprinting and in order to operate the machine in a useful manner, the machine is capable of four basic modes of operation, now briefly described, and referred to throughout the following description.

(1) If the character to be printed is located on the inner typewheel row, the machine will *print first* and then space the tape. This will be referred to as the "PRINT—SPACE" mode of operation. Note, at the end of this operation the tape is properly positioned to undergo a succeeding "PRINT—SPACE" operation if the next character to be printed is located on the inner row.

Although the tape has been stepped so that the character just printed is now directly under the outer typewheel row, a character selection from that row will not overprint because of the next described mode of operation.

(2) If the character to be printed is located on the outer typewheel row, the machine will *space the tape first* and then print the character. This will be referred to as the "SPACE—PRINT" mode of operation. Note, at the end of this operation the tape is positioned with the just printed character under the outer typewheel row, the same as the finish position of the "PRINT—SPACE" mode of operation. Thus the machine is ready to undergo a succeeding mode of operation which can be either "PRINT—SPACE" or "SPACE—PRINT" depending upon which row contains the character to be printed. In this manner, the resultant printed message will be properly serially recorded on the tape.

Determination of one or the other of the above two briefly described modes is by a sixth bit added to a five unit code signal combination, which in fact makes the code signal a six bit combination. Depending upon the presence or absence of a positive sixth bit pulse in the received signal, the control circuitry, which will be fully described, selects the mode of operation to record the desired character from the proper row.

Another point to be understood is that there are two print hammers, one of which is used only with the inner typewheel row of characters and the other of which is used only with the outer typewheel row of characters.

(3) A third mode of operation is designated the space but no printing mode, i.e., "SPACE—NO PRINT." Thus, if a space code signal is received, there is an automatic inhibiting of the operation of the counting and printing control circuits as a result of which, no printing actuation occurs. Yet at this time, a space signal is immediately directed to the tape feed mechanism, resulting in a spacing of the tape but no printing.

(4) The fourth mode, entitled "MANUAL TAPE FEED," is just what its name implies. This operation is provided by a switch which inhibits counter and printing operations and feeds signals directly to the tape feed mechanism.

As previously mentioned, to hurdle the mechanical speed limitations of tape feed mechanisms, duplicate tape feed devices are provided and their operation is always successively alternate. This is true regardless of which one of the four modes of operation is utilized.

The ink ribbon feed for the typewheel ink ribbon is stepped once for every second printer cycle of operation. The circuitry for this operation is electronic and will be described.

The printer operates from six lines of data, received in parallel, plus a strobe line. As is conventional, each line furnishes one of two signals, sometimes referred to as "yes—no," "mark—space" or "pulse—no pulse." Information can be accepted at the rate of from 0 to 30 characters per second.

For convenience, the exemplary printer has been arranged to receive code signals in the form of five-unit binary code combinations. The source of the signals is not a part of the present invention; it may be a telegraphic transmitter, the output from a data computor or data storage device such as a magnetized tape record. Merely by way of example, a magnetized tape record carrying the binary code information could have five channels recorded across the width of the tape with each channel designating a different position in the five position binary code. In the code, binary digit "1," present at any of the five positions, is represented by a magnetic spot recorded in an appropriate channel on the tape, while the binary digit "0" in any of the five positions is represented as an absence of a magnetic spot in the appropriate channel on the tape. The sixth channel is not used in the binary counter of the printer but instead is used for "odd-even" triggering purposes to select one of the "PRINT—SPACE" or "SPACE—PRINT" modes, as will be fully explained hereinafter. A seventh channel can be included on the tape for use as a strobe or synchronization pulse channel and would have a magnetized spot occurring at each point along the tape where the other six information channels comprising a set of binary signals are to be recorded.

When a magnetic tape storage device is used to feed the printer, the means for reproducing the information recorded on the tape could be any suitable tape reproduction device, it could include a multi-channel head structure including a separate head for each of the channels recorded on the tape; a supply reel and a take-up reel. The tape would be passed over the multi-channel head from the supply reel to the take-up reel at a uniform rate of speed by a motor. Tape operation remote control can be included, however, inasmuch as the reproduction and reading of such information is not part of this invention, the components thereof will not be further described herein. If signals are derived from a tape storage device, the binary signals recorded on the magnetic tape induce pulsating voltages in the pick-up head, which voltage signals can be amplified and/or shaped as desired and applied through corresponding leads to a five stage binary counter circuit (see top of FIGURE 1) of the printer of this invention. The code combination jams or pre-sets the counter to a desired count condition. Also, a sixth bit signal line leads to the single stage binary counter No. 6 (also at the top of FIGURE 1) which determines the selection of operation modes 1 and 2 (PRINT—SPACE or SPACE—PRINT), and a seventh input signal line to the strobe input (No. 7 at bottom left of FIGURE 1).

The position detection pulse generated counts correspond to five unit binary code numbers. Many arrangements of the order of characters represented by serially generated binary code combinations are, of course, possible. For example, the 180° out-of-phase positions 1 and 33 on the typewheel and on the sixty-four notch clock disc could both be for the two characters A and B, and the serial pulse count of one from the sixty-four notch wheel as expressed by the five unit binary code would be 00001. Thus binary code 00001 represents both characters, but the characters are on different rows, e.g., A would be on the inner row of the typewheel and B on the outer row of the typewheel. Similarly, C and D could be represented by a two count pulse, which is the five unit binary code 00011, E and F by the three count pulse or code 00100 and so on for thirty-two sets of two or a total of sixty-four different characters (symbols, numbers, etc.).

Returning to the binary counter, as has been stated, it is the "destructive read-out" type, i.e., the counter is pre-set by the received simultaneous code signal and pulses sent into the counter by the sixty-four (64) notch clock wheel 34 will complete the counter operation from the pre-set count, through the thirty-two count whereupon the counter returns to its zero count condition, at the same time providing a control pulse signal to operate the printer functions.

In destructive read-out, the code combinations representing characters on the incoming signal lines are the complement of the serially produced binary signal count from the printer clock disc. Thus, using the five unit binary code (thirty-two numbers not including zero), the complementary number for the A and B print positions, noted previously as being 00001 in the printer, would be 31 or 11111.

To print A or B, therefore, the incoming code signal on lines 105 would consist of a pulse on each line or 11111 which will jam or pre-set the binary counter to 31. Thus when one (1) pulse is received from the sixty-four notch clock disc (after an index pulse) one or the other of the two characters A and B can be printed. With A located on the inner row 42 of the typewheel 22 and B on the outer row 44, the absence or presence of a signal pulse on the sixth incoming line will be used to determine whether the desired character to be printed is A or B.

Control Circuit and Operation

Inasmuch as the mechanical printer components are actuated by the control circuit, the control circuit will be first described, leaving the specific details of the mechanical components of the printer to be described in detail in a later portion of this specification.

In describing the control circuitry, reference will be primarily to FIGURE 1 and the symbolized components such as the binary counter registers, "and" units, delay units, current drivers, etc. The specific manner in which each circuit component accomplishes its function will be understood by those skilled in the art and is clearly apparent from the detail circuit in FIGURES 7–16.

As has been forenoted, the printer has four modes of operation, "PRINT—SPACE," "SPACE—PRINT," "SPACE—NO PRINT" and "MANUAL FEED-OUT." The circuits to accomplish these modes will be described in the order named.

Print—Space Mode

The print-space mode records a character on the inner row 42 of the typewheel 22 and then feeds the tape 40 one step. Because the adjacent two different characters on the typewheel inner and outer rows 42 and 44 are represented by a single incoming simultaneous five unit binary code to binary counter 50 and are also represented by a single serial binary count (complement of the simultaneous code) from the clock disc 34, one additional incoming data line 6 is used to determine whether there will be a "print first—space later" operation or a "space first—print later" operation. If so information is received from data line 6 by the sixth register 46, the character desired for selection will be on the inside row 42 of typewheel 22, and accordingly, the character must be printed first and the tape 40 must then be stepped. In the "print first—space later" condition, binary code information is received on lines #1 through #5 to the binary counter registers 51–55 and no signal will be present on line #6 to register 46. At the same instant a "strobe" signal will be received on line 7 which is connected to a 150 microsecond delay 56 to assure that the received data on lines 1–5 is completely entered in the registers 51 through 55 of counter 50.

Figure 4:
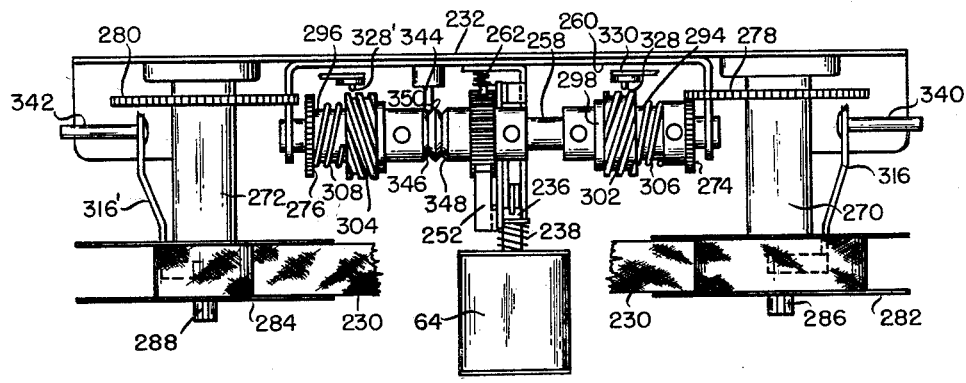
FIGURE 4 is an enlarged top plan view of the mechanical components of the ink ribbon feed and reverse apparatus.
Figure 5:
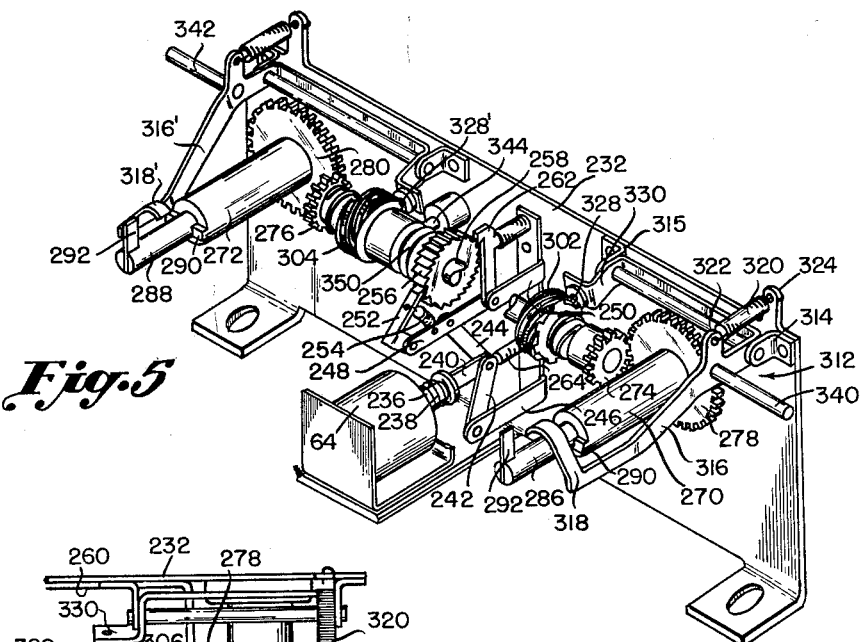
FIGURE 5 is a perspective view of the ink ribbon feed and reverse apparatus seen in FIGURE 4.

From the 150 microsecond delay 56, the "strobe" signal pulse passes through a circuit line 57 to several branches, one of which is a ribbon feed divide-by-two register 58 which requires two consecutive pulses to operate a ribbon feed one-shot multivibrator 60 of 14 milliseconds' duration which in turn feeds a current driving stage 62 to activate a ribbon feed solenoid 64 to move the inking ribbon 66 (see FIGURES 2, 4 and 5). Thus the ink ribbon feed mechanism will be activated once for every other strobe input signal. A detailed description of the mechanical operation of the ink ribbon feed mechanism is presented hereinafter.

The 150 μs. delayed "strobe" pulse on line 57 is also presented to a "space—no print" blocking gate 68 which, as will be later described, is blocked only when a simultaneous 00000 condition is present in binary counter 50.

So long as a character signal is present on input lines 1–5, the blocking gate 68 passes the delayed strobe pulse to an A register 70, cocking the A register 70 to enable acceptance of indexing signal information from the amplifier 41 of the two notched index wheel 22 on the typewheel shaft 24. Cocking of register A pulses a 14 ms. delay one-shot 72 which is tripped to provide a 14 ms. blocking of a reset line 76 to a B register 74, by means of an end-of-count "and" gate 75.

The first index pulse from the pick-up coil 38 of the two notch wheel 32 passes through its amplifier stage 41 to the reset line of the A register 70 which trips and, in turn, trips the B register 74. Tripping of B register 74 through a circuit line 78 opens the "and" gate 79 to the binary counter input line 80, permitting the sixty-four (64) notch clock disc 34 to serially enter its pulses through its amplifier stage 43 and the opened "and" gate 79 into the $2^5$ counter stages of binary counter 50. The serial pulses entered into the $2^5$ counter registers 51–55 complete the count, previously pre-set by the received simultaneous binary code data on lines 1–5, to zero. The final serial pulse from clock wheel 34, which clears the binary counter 50, gives rise to an output of the fifth stage 55 which feeds back through previously described reset line 76 to and through the end-of-count "and" gate 75 to turn off the B register 74 which, in turn, closes the count "and" gate 79.

If an end-of-count signal on the reset line 76 from binary counter 50 occurs before the 14 millisecond delay 72 (which controls the end-of-count gate 75) has completed its time cycle, the end-of-count gate 75 remains closed and the B register 74 will not be turned off. Accordingly, the sixty-four (64) notch wheel 34 and pick-up 39 will continue to dump pulses through the counter input gate 79 into the $2^5$ counter registers 51 through 55 (which at this stage of the cycle are no longer pre-set) for thirty-two more pulses (180° rotation of typewheel shaft taking 15.2 ms.) and the ensuing end-of-count pulse through line 76 to the now open end-of-count gate 75 will reset the B register 74, closing the count gate 79.

When the B register 74 becomes reset, a signal goes out on a circuit line 81 to a 500 microsecond delay one-shot 82 and prevents the #6 register 46 from being prematurely reset. This same signal from B register 74 on line 81 also goes to three additional units, (1) a paper feed "and" gate 85, (2) a print hammer "and" gate 83 which controls an actuating signal to the print—space (PS) print hammer actuation circuit and (3) a second print hammer "and" gate 84 which controls an actuating signal to the space—print (SP) print hammer circuit.

In the presently considered print first—space later (PS) condition, the PS print gate 83 has been initially conditioned by the fact that there was no data input on the input line 6 to register 46 and, therefore, when the pulse from B register 74 feeds to the PS print gate 83, the signal passes to a phasing one-shot delay 86 which in turn pulses a one-shot multi-vibrator 87 and a current driver stage 88, which in turn energizes a PS hammer operating solenoid 89. When PS solenoid 89 is energized, the corresponding print hammer 90 (see FIGURE 2a) is caused to record the selected character from the inner typewheel row 42 on the tape 40. The mechanical structure and function of the print hammers will be later described.

Because in this PS mode of operation no data was received on the receive signal line 6 to register 46, the aforedescribed paper feed "and" gate 85 was conditioned at the same time as was the PS "and" gate 83 so that when the pulse comes from B register 74, the signal passes through the feed "and" gate 85 and a pulse is sent to a paper feed divide-by-two register 94 which in turn pulses one of two paper feed one-shots 98 or 100 to trigger a corresponding one of two current drivers 101 or 102, which energizes an associated one of two feed operating solenoids 103 or 104. Successive pulses to the paper feed divide-by-two register 94 operate alternate ones of the two paper feed solenoids 103 or 104.

The specific circuit for energizing the print—space hammer solenoid PS is illustrated in the left-hand portion of FIGURE 15 and in view of its unique biasing arrangement, will be described in detail. The input signal is on lead 400 which is the output signal from phasing one-shot delay circuit 86 of FIGURE 1. The print hammer one-shot multi-vibrator 87 may be composed of a pair of P-N-P transistors 402 and 404. The current driver stage 88 of FIGURE 1 may be composed of a power transistor 406 and a driver transistor 408. The print hammer solenoid coil 89 is connected to the collector terminal 410 of power transistor 406.

The emitter 412 of power transistor 406 may be connected directly to ground and base 414 connected to the emitter 416 of driver transistor 408. The collector of driver transistor is connected through a 25 ohm resistor to a negative 32 volt potential terminal of the power supply. The emitter-collector current condition path for drive transistor 408 includes emitter 412 and base 414 of power transistor 406.

The base of driver transistor 408 is connected directly to the emitter of multi-vibrator transistor 404. Its collector is connected through a 150 ohm resistor to a negative 20 volt potential terminal of the power supply and its base connected to the collector of multi-vibrator transistor 402 which serves as one feedback path for the multi-vibrator circuit. A second feedback path is from the collector of transistor 404 to the base of transistor 402 and includes the usual resistor-capacitor circuit with a voltage divider including a variable resistor to permit adjustment of the length of time the one-shot multi-vibrator is in its unstable condition.

A novel bias arrangement is provided for transistors 404, 408 and 406 which may consist of conventional silicon diodes 418 and 420 such as those designated commercially SR162. These diodes have a barrier potential of about 0.6 volt. Each diode is connected directly between the base and emitter of its associated transistor and, in the embodiment illustrated, poled with its positive terminal connected to the base and its negative terminal connected to the emitter.

With N-P-N transistors, the polarity of diodes 418, 420 and power supply potentials would be reversed accordingly. Diodes 418, 420 are connected in series and through the base-emitter path of transistor 406 to ground and to junction 422 between the collector of transistor 402 and resistor 424 to a negative 20 volt terminal of the power supply.

In normal condition, transistor 402 conducts heavily to provide a slightly positive potential relative to ground junction 422. The magnitude of this positive potential must be sufficient to exceed the combined barrier potentials of all of diodes 418, 420 to thus assure that their respective transistors are reverse-biased to be non-conducting. A potential of about +4 volts has been found to be satisfactory for the circuit illustrated. As the barrier potential of a germanium transistor is about 0.26 volt, the voltage drop of about 0.6 volt across diodes 418, 420 is sufficient to assure cutoff of transistors 404 and 408, and the positive potential on base 414 of transistor 406 prevents conduction through it.

When a positive going edge of the pulse on input lead 400 is received at the base of transistor 402, transistor 402 cuts off, thereby lowering the potential at junction 422 to about negative 20 volts, and transistor 404 then begins conduction. Driver transistor 408 and power transistor 406 are also triggered "on" and solenoid PS is energized. Thereafter, transistor 402 again becomes conductive due to the negative bias on its base and the remaining transistors are cut off.

In this type of circuit, the power transistor 406 carries about 16 mils while driver transistor carries about 2 mils and multi-vibrator transistor carries about 200μ amps.

Each transistor has to be provided with different bias voltages to operate with these current capacities. In the past, additional voltage taps in the power supply had to be provided to supply the necessary operating and bias voltages. By use of diodes 418, 120 in this particular type of circuit, it has been possible to eliminate the otherwise necessary circuit components and thus simplify the circuit in material respects.

As will become apparent, other solenoid driving circuits, such as those used for the space—print hammer, paper feed and ribbon feed are arranged in a manner similar to the driving circuit for the print—space hammer solenoid, just described, and such circuits therefore will not be described in detail.

*Space—Print Operation*

Considering now the second mode of operation, if the character to be printed is located on the outside row 44 of typewheel 22, a space first—print later (SP) operation is required. In this instance, data information will be received on the input line 6 to register 46 coincident with the received binary code data on lines 1–5. A signal data pulse on line 6 resets register 46 and sends current through circuit line 108, a branch of which feeds the current to drive a 5 millisecond delay 110. After the 5 millisecond delay, a pulse from the delay unit 110 through a circuit line 111 by-passes paper feed "and" gate 85 and will directly energize the paper feed divide-by-two register 194 to alternately drive one of the paper feed one-shots 98 or 100, the associated one of the current drivers 101 or 102 and finally the associated one of the two feed solenoids 103 or 104. The paper tape 40 is thus stepped after only a 5 millisecond delay without waiting for an output pulse on line 81 from the B register 74.

The #6 register 46 also determines which of the two hammers, the inside PS hammer 94 or outside SP hammer 112, is to be used for printing. In this instance, SP mode of operation, the output from the "0" side of register 46, which is now in reset condition, will condition the SP print hammer gate 84 so that when an output pulse from B register 74 is received on line 81, the SP print hammer gate 82 is open and will feed a pulse to the SP phasing one-shot delay 114, thence on to the SP one-shot multivibrator 116 and finally to the current driving stage 118, energizing SP print hammer solenoid 119 to actuate the SP print hammer 112 (FIGURE 2A).

The output pulse from B register 74, as has been described in the PS mode, also pulses the 500 microsecond delay one-shot 82 which clears the #6 register 46 to its set condition and relieves the SP controls through line 108 on the paper feed gate 85 and the SP print hammer circuits. The phasing one-shot delays 86 and 114 (see FIGURE 14) are used to make relative adjustments between typewheel position and time of impact of print hammers 90 and 112 to compensate for electrical fluctuations or mechanical inaccuracies.

*Space—No Print Operation*

Considering now the third mode of operation, the signal operated tape feed-out function (space-no print), no data is entered into the $2^5$ binary counter 50 nor through the #6 line to register 46 (i.e., the binary code signal 00000 and a sixth 0). However, the strobe pulses to strobe line 7 will be continuously sequentially received. "0" condition circuits between binary counter 50 and the "space—no print" "and" gate 67 provide for the "0" condition of all of registers 51–55 to open the "space—no print" control gate 67, which in turn conditions the previously described space—no print blocking gate 68 to closed condition. When gate 68 is closed, it prevents the delayed strobe pulses on strobe input delay line 57 from passing through to the A register 70 and this in turn inhibits the counter triggering function of the index pulses from the two notch wheel 32. Nevertheless, the delayed strobe pulse in line 57 is channeled to both the ribbon feed mechanism divide-by-two register 58 and through an "and" gate 120, which is conditioned by the 00000 controlled pulse in circuit line 57 from the space—no print control gate 67, to the aforedescribed 5 millisecond delay 110. From delay 110 the pulse is fed through line 111 to the divide-by-two paper feed register 94 and alternately through delays 98 or 100 and current drivers 101 or 102 to the associated feed solenoid 103 or 104.

Thus, one or the other of tape feed solenoids 103 and 104 is energized to step the paper tape 40 one step for each strobe pulse received on line 7 and this stepping occurs without actuation of the print selecting mechanism which is completely inhibited so no printing of characters and no counting of pulses occurs.

Manual Tape Feed-Out Operation

In the fourth mode of operation, manual tape feed-out, a manual switch button 122 (bottom center of FIGURE 1) is closed to ground. While the printer motor is running, closing of switch 122 will condition a manual ribbon and feed control "and" gate 124, permitting the amplified indexing pulses from the two notch wheel 32 to pass through the gate 124 to the aforedescribed ribbon feed divide-by-two register 58, and thence on to the ribbon feed circuit. The pulses in this circuit branch off through a manual feed "and" gate 126 to the divide-by-two paper feed register 94 and thence through the aforedescribed paper feed circuit to step drive the paper feed mechanism.

The ribbon feed mechanism is operated at this time (as well as in all other modes of operation) even though no printing takes place and such feed is permitted due to the fact that it simplifies the electronic circuitry.

Effective Storage

An effective storage is accomplished by using the 180° repetition of characters on the typewheel 22. In other words, thirty-two (32) characters are placed in a specific sequence on one half of one row of the typewheel 22 and the same characters are repeated in the same sequence on the other half of the same row of the same typewheel 22. If, for example, a serial pulse count of six spaces dumps the binary counter 50 but the "end-of-count" pulse from B register 74 is inhibited due to the 14 millisecond one-shot delay 72 not having enough time to operate before the counter 50 dumps, the serial pulses from clock disc 34 would continue to step the counter 50 for thirty-two spaces, at which time the typewheel position is such that the same character on the opposite side of the typewheel 22, that we were looking for when the "end-of-count" pulse was inhibited, has arrived at print position. Thus, some storage is achieved without the use of a complicated storage unit.

Timing Chart

The FIGURE 17 timing chart enables one to follow the timing of a PS or SP mode of operation.

In the PS mode, if a data signal is received calling for the fourth character on the inside row to be printed, the strobe pulse will be received on line 7 and data entered through lines 1–5 to pre-set the binary counter 50 to the complement of a four count (the character position on the typewheel). The strobe pulse is delayed 150 μs. to assure data entry in the counter 50 and then cocks the register A and conditions the 14 ms. delay 72 (end-of-count inhibitor). Subsequent to cocking of register A the next index pulse from index clock wheel through amplifier 41 triggers register A and resets register B to condition the sixty-four (64) notch gate 79 and pulses are permitted to pass as shown. At the end of the fourth pulse count (X on the timing chart) the counter shifts from thirty-one to zero and attempts to pulse register B with an end-of-count pulse. However, the 14 ms. end-of-count inhibitor is still within the 14 ms. delay period so register B remains in reset condition and the position pulse counts continue to pass the sixty-four (64) notch gate 79 until the counter again shifts to zero position (thirty-two more pulses and shown at position X′ on the timing chart).

The timing chart will show that the end-of-count inhibitor delay period of 14 ms. is completed and the end-of-count pulse at X′ can set register B as shown. Setting of register B will immediately pulse the PS phasing delay one-shot 86 and the divide-by-two paper feed. PS phasing can be adjusted to pulse the PS hammer one-shot and energize the PS hammer solenoid within a small degree of typewheel rotation. A similar phasing adjustment of the paper feed can be made but is not shown on the timing chart. Paper feed requires a greater time than printing so even if both mechanical operations are initiated simultaneously, printing will be accomplished well ahead of tape spacing.

This operation in the PS mode, up to the point where an end-of-count pulse passes through the B register, will be completed in from 15 to 29.85 ms., depending upon rotational location of the notches in the two notch wheel relative to the incoming strobe pulse and upon which character is desired to be printed.

At the right-hand portion of the timing chart, the 33 ms. line is the start of a new received signal combination which calls for an SP mode of operation calling for printing of the twenty-eighth character in the outer typewheel row. Here again, there is a received data group on lines 1–5 and a received strobe pulse on line 7. However, there is also a received pulse in the #6 register 46 which flips to a reset condition and stays there during the counting operation.

The delayed strobe pulse through delay 56 cocks register A which upon receipt of the next index pulse resets register B and conditions the 14 ms. delay. Resetting of B register permits the position pulses to pass into the counter. Excepting for resetting of the #6 register, this operation so far is identical to the PS mode shown at the left side of the timing chart.

In this case, the twenty-eighth pulse (X″) will shift the counter to zero after the delay period of the 14 ms. delay has passed and therefore the end-of-count pulse, when the counter shifts, can set the register B and send a pulse to the printing and paper feed circuits.

Dropping down on the timing chart, it is seen that coincident with resetting of #6 register 46, the 5 ms. delay 110 was pulsed and when that delay has passed, the SP paper feed circuits are pulsed to step the tape. Note that this paper feed operation is completed before the end of the 14 ms. delay period provided by the end-of-count inhibitor 72, and therefore the paper tape has completed a shift before the B register pulses the SP print hammer phasing one-shot 114. The B register pulse passes through the 500 μs. delay 82 and flips the #6 register 46 back to a set condition. At this instant the machine can receive another code signal.

Here again, the SP mode of operation up through the pulsing of the 500 μs. delay 82 will be completed in from 15 to 29.85 ms. The strobe pulses and received signal groups are received every 33 ms. or 30 times each second which will permit at least a 3 ms. period between each character counting cycle.

Mechanical Structure and Operation

Referring primarily to FIGURE 2, the relationship between all mechanical components can be seen. The motor 26, pulleys 28, 29, belt 30, typewheel and clock disc shaft 24, typewheel 22, the two (2) notch indexing clock disc 32, and the sixty-four (64) notch position pulse clock disc 34 have all been described.

*Tape feed.*—An important aspect of the present invention is the dual tape feed mechanism, the two independent driving assemblies which operate alternately for successive operating cycles of the machine. The tape feed mechanism 130 is shown in an enlarged detail view in FIGURE 3 and in combination with the other mechanical printer components in FIGURE 2.

As has been described in the foregoing sections on circuit operation, each time a paper tape feed signal is applied to the paper feed divide-by-two register 94 (see FIGURE 1), a momentary energization of one or the other of the paper feed solenoids 103 or 104 will occur. These two solenoids 103 and 104, in FIGURE 3, are secured to a bracket structure 132, 133 attached to the machine frame (not shown) on each side of the typewheel shaft 24 (see FIGURE 2) and behind the typewheel 22. Except for differences enabling right and left-hand mounting, the two assemblies of tape feed solenoids and attached operating mechanisms are identical, hence only one assembly will be described in detail.

A tape feed solenoid 103 includes a reciprocable plunger 134 with a slotted end 136 embracing and pivotally secured to a mid-section of a pawl driving lever 138 by a spring pin 140. The upper end 142 of pawl driving lever 138 is pivotally mounted on a horizontal stud 144 secured to bracket 132, while the lower end 146 of the lever pivotally carries a pawl 148, the driving end 150 of which engages the teeth of a tape feed ratchet wheel 152. Extending from the rear end of pawl 148 is an ear 154 to which one end of a pawl biasing spring 156 is attached, the other end of spring 156 being anchored to lever 138 so the spring biases pawl 148 against the ratchet wheel 152.

The limit of the driving stroke movement of pawl 148 is set by an adjustable stop screw 158 threaded in a bracket ear 160. The limit of the return stroke movement of pawl 148 is provided by an adjustable stop screw 162 in the path of movement of the driving lever 138 and aligned with the solenoid plunger 134, the return stop screw 162 being threaded in a second ear 164 on bracket 132. A third ear 166 at the lower edge of bracket 132 mounts a leaf spring detent 168, the end of which is flexed up against the ratchet wheel 152 to serve as an anti-backlash stop for the ratchet wheel when the pawl 148 is making its return stroke. A fourth bracket ear 170 serves as an anchor for one end of a heavy pawl lever return spring 172, the other end of which is attached to the lower portion of the pawl driving lever 138.

Ratchet wheel 152 is non-rotatably secured to a lateral shaft 174 which (see FIGURE 2) passes just to the rear of the lower portion of the typewheel 22. The opposite end of shaft 174 carries a second ratchet wheel 152', identical to ratchet wheel 152, non-rotatably secured thereto with the circumferential teeth locations matched with those of wheel 152. The alternate tape feed solenoid 104 has pawl operating components similar to those just described which coact with the second ratchet wheel 152' to rotate the shaft in steps exactly equal to the step rotation enabled by solenoid 103 and pawl 148.

Paper tape 40 is driven by engagement between two rollers 176 and 178 made of rubber or the like material. Roller 176 is non-rotatably secured on shaft 174 at the approximate mid-point of the shaft and the idler roller 178 is mounted on an axis parallel to shaft 174 so the rollers are in a slightly compressed engagement. The main roller feed shaft 174 and the idler roller shaft 180 are suitably journalled (not shown) on the machine frame and located in a manner so that the paper tape 40 which feeds between rollers 176 and 178 from a supply roll (not shown) will pass under and tangent to the bottom center of the typewheel 22 (see FIGURE 2).

Considering the mechanical operation of the tape feed mechanism 130, a tape feed signal pulses solenoid 103 or 104 (not both at once) pulling plunger 134 inward, and it, being attached to pawl driving lever 138, causes lever 138 to pivot counterclockwise on pivot stud 144. Pawl 148 on the lower end of lever 138 is held continuously in contact with the teeth of ratchet 152 and when lever 138 moves counterclockwise, will engage and push on a ratchet tooth, rotating ratchet 152 in a clockwise direction until end 150 of the pawl hits stop 158. The detent leaf spring 168 assures a positive stepping action. Ratchet 152, being affixed to shaft 174, rotates shaft 174 clockwise. Roller 176, being attached to shaft 174, rolls compressed against the mating idler roller 178 and the tape 40 passing between the two rollers is thus fed in steps under the rim of the typewheel 22, above the aligned print hammers 90 and 112 and above the ink ribbon.

With this dual arrangement of tape stepping assemblies, successive driving actuations of each lever and pawl unit can be started while the previously actuated lever and pawl unit is starting its return movement. Thus the maximum speed of operation of tape feed of the machine, as determined by the time cycle of operation of the pawl linkage, is doubled.

*Printing mechanism.*—The print hammer mechanism 190 is shown in combination with the other mechanical components in FIGURE 2 and in detail in FIGURES 2A and 2B. The PS and SP print hammer solenoids 89 and 119, previously described in conjunction with the control circuit, are energized, in response to receipt of a character code and a signal determining which of the two solenoids is to be energized, in timed relation to the rotation of characters on the rim of the typewheel so a print hammer will impact the proper character in its pass above the printing station.

As previously described, two distinct print hammers 90 and 112 are provided, hammer 90 being associated with the PS solenoid 89 and used to print characters carried by the typewheel inner row 42, and hammer 112 being associated with the SP solenoid 119 and used to print characters carried by the typewheel outer row 44. The two hammers 90 and 112 are clearly seen in FIGURE 2A arranged in tandem along the tape feed path and (as shown in FIGURE 2) adjacent the bottom center of the typewheel 22. Each hammer has a low mass and consists of a flat bar-shaped shank 192, 193 and a small impact head 194 and 195, the shanks being reciprocally guided in a slotted bracket device (not shown) secured to the machine base. Movement of each hammer is in a straight vertical path radially with respect to the typewheel. One edge of each hammer shank 192 and 193 is notched at 196, 197 to receive an end 198, 199 of an associated solenoid armature lever 200, 201. A hammer return spring 202 and 204 is fastened to the lower end of each hammer shank, the other ends of the springs being fastened to a spring anchor bracket 206 which is fixed to the machine support structure.

As seen in FIGURE 2B, the hammers are disposed through suitably shaped apertures 208 and 209 in a paper tape guide plate 210 which extends under the typewheel 22. The hammer heads 194 and 195, in retracted position, will be disposed in recessed cavities 212 and 213 in the upper surface of guide plate 210, the base shoulders of the cavities 212 and 213 serving as a limit stop for the hammers in their retract position.

Armature levers 200 and 201 extend side by side toward the two print hammer electromagnets 89 and 119 and are pivoted on a horizontal rod 214 mounted in ears of the bridges 216 and 218 of the electromagnets. The pole ends 220 and 222 of armatures 200 and 201 extend parallel and closely adjacent the electromagnet pole faces 224 and 226 and armature retract springs 228 and 229 bias the armature in a direction which tends to retract the hammers so the armature pole ends 220 and 222 are shifted away from the electromagnet pole faces.

In the printing operation, if the PS magnet coil 89 (for example) is energized by the control circuit, the pole end 220 of armature 200 is pulled toward the pole face 224, pivoting on rod 214. The opposite end 198 of armature 200 moves up sharply to vertically shift the PS hammer 90 causing its head 194 to strike the underside of tape 40 forcing it against the ink ribbon 130 and the ink ribbon against the appropriate print character on the inside typewheel row 42 to cause an inked imprint on the tape. Energization of electromagnet 89 is a one-shot of minute duration, the coil being de-energized before the hammer impact occurs. Accordingly, springs 202 and 228 at impact rebound cause immediate return of the hammer 90 to its rest position.

Mechanical actuation of the SP hammer 112 is identical to that of hammer 90 excepting its head 195 impacts the tape and ink ribbon against the selected character on the outer typewheel row.

*Ink ribbon mechanism.*—This mechanism includes ink ribbon feed and reversal and will be described with specific reference to FIGURES 4, 5 and 6 and general reference to FIGURE 2.

In this mechanism as in the tape feed and the printing mechanism, operation is under control of the aforedescribed electronic circuit, a ribbon shift being accomplished each time an impulse signal causes momentary energization of the ribbon feed solenoid 64.

The mechanical components of the ink ribbon mechanism are mounted on a vertical plate-like bracket 232 (FIGURE 5) which is secured to the machine base plate. The bracket has been omitted from FIGURE 2 for purposes of clarity.

A small bent shelf 234 extends forwardly from the approximate mid-point of the lower edge of bracket 232 and mounts the ribbon feed solenoid 64. This solenoid 64 faces the vertical plate bracket 232 and its plunger 236 shifts fore and aft in a horizontal path, being biased in an aft direction toward the bracket 232 by an encircling coil spring 238. A link 240 in approximate alignment with plunger 236 is pivotally fastened at one end to the rear end of plunger 236 and has its other end pivotally connected by a common pivot to one end of a guide link 242 and one end of an operating link 244. Guide link 242 has its other end pivotally fastened to a fixed lug 246 while the other end of the operating link 244 is pivotally fastened to the approximate mid-point of a pawl lever 248. The rearward end of pawl lever 248 is pivoted to a fixed lug 250 and its forward end pivotally carries a pawl 252 which is biased by a pawl spring 254 into engagement with a ratchet wheel 256 non-rotatably fastened on a ribbon reel drive shaft 258.

As is clearly apparent from FIGURE 4, the reel drive shaft 258 carries other components, to be described hereinafter, and each of its ends is journalled in one of a pair of spaced ears of a U-shaped bracket 260 rigidly secured on the support bracket plate 232. The mounting of shaft 258 in bracket 260 permits a slight axial shift for ribbon feed reversal purposes, as will be described. Going back to FIGURE 5, the disposition of links 240, 242, 244 and lever 248 is such that a forward shift of the solenoid plunger 236, when solenoid 64 is energized, will tend to vertically align the guide link 242 and operating link 244, which forces the pawl lever 248 to shift clockwise. This movement of lever 248 will shift pawl 252 to engage a tooth of and rotate the ratchet wheel 256 and shaft 258 one step clockwise. A spring loaded detent lever 262 (behind the ratchet wheel) engages the ratchet to prevent reverse movement of the shaft 258 when the pawl retracts back over the ratchet teeth.

Retracting force is derived from stored energy in coil spring 238, the retract limit stop position being determined by abutment of the combined pivot connection of links 240, 242 and 244 with the end of an adjustment screw 264 threaded in the bracket plate 232.

Two parallel and horizontally arranged ink ribbon spindles 270 and 272 are journalled on the front side of the support bracket plate 232 and extend adjacent the ends of the ribbon operating shaft 258. Large gears 278 and 280 are attached to respective ribbon spindles 270 and 272 and ink ribbon reels 282 and 284 slip over the spindle ends 286 and 288 and drive connect to the spindles by means of the fingers 290. The reels are locked in place by the swivel lock tabs 292. As shown in FIGURE 2, the ink ribbon 230 passes from the inner side of one reel up and over the tape guide plate 210 (FIGURE 2B), over the hammers 90 and 112 and over the tape 40. A suitable ribbon guide device (not shown) is preferably fastened on the tape guide plate 210 to maintain the ink ribbon 230 in its lateral path directly under the typewheel 22.

Referring now to FIGURE 4, it will be seen that two small gear units 274 and 276 with axial sleeves 294 and 296, having radial flanges 298 and 300 spaced from the gear portions 274 and 276, are non-rotatably fixed on the ribbon driving shaft 258. Note the sleeves are also non-rotatably and axially secured on shaft 258 and will be described further in connection with ribbon feed reversal. In FIGURE 4, the right-hand small gear 274 is meshed with the right-hand ribbon spindle gear 278 while the left-hand small gear 276 is not in mesh with its spindle gear 280. A slight leftward axial shift of the drive shaft 258 will disengage the right-hand gears 274 and 278 and engage the left-hand gears 276 and 280, this function being a part of ribbon reverse. But for the present, it is noted that with gears 274 and 278 in mesh, stepped rotation of ratchet wheel 256 clockwise (FIGURE 5) will rotate the right ribbon reel 282 counterclockwise to wind ribbon 230 on reel 282 and remove ribbon from the left-hand reel 284. When gears 276 and 280 are meshed, obviously, the winding operation between reels is reversed with reel 284 being the take-up reel.

With respect now to the automatic reversal mechanism, each of the small gear unit sleeves 294 and 296 non-rotatably carries a gear worm 302 and 304 respectively between the associated small gear 274 or 276 and associated radial flange 298 or 300. Worms 302 and 304 can be splined to the sleeves and assembled before the sleeve and gear are assembled as a unit. Each worm 302, 304 is biased against its associated radial flange 298 or 300 by a coil spring 306, 308 to afford a cushion or delay if the gears 274 and 278 or 276 and 280 do not initially mesh when drive shaft 258 is shifted.

Best shown in FIGURE 5, each reel includes an associated linkage which constitutes a reel condition sensor and drive shaft reversing actuator. One is right-hand and the other is left-hand, otherwise they are identical, so only the right-hand sensor-actuator 312 will be described. Portions of the sensor-actuators are deleted from FIGURE 4 for clarity but details can be seen in FIGURES 5 and 6. The actuator 312 is U-shaped and is pivotally mounted on ears 314 and 315 mounted on the support bracket plate 232 behind the associated ribbon spindle gear 278. One end 316 of the U-shaped member is formed as a long arm which projects to a position inside the annular hub 317 in the rear of ribbon reel 282 (see FIGURE 6) terminating in a right-angled curved finger 318. A spring 320 connected between an ear 322 on arm 316 and an anchor lug 324 on bracket 232 biases the actuator 312 clockwise (FIGURE 5) causing the curved finger 318 to engage the inside surface and edges of the reel hub 317. If ink ribbon is present on the reel 282, the finger 318 will reach a limit position determined by the ribbon. However, if the ribbon is exhausted the finger 318 moves out through a reel hub opening 326 under urging of the spring 320.

When the actuator 312 senses an exhausted reel and shifts to its full clockwise position with finger 318 through a reel hub opening 326, a pin 328 carried by a short arm 330 on the opposite end of the U-shaped actuator shifts up into engagement with the threads of worm 302. Since the ribbon feed drive shaft 258 continues to rotate in steps as the control circuits demand ribbon feed, the worm wheel 302 rotates clockwise and the direction of feed of its threads against the axially immovable pin 318 will shift the shaft to the right and cause meshing of gears 274 and 278, after which shift reel 282 becomes the take-up reel. The first turning movement of reel 282 as a take-up reel will cause retraction of the pin 328 of actuator 312 because the edges of the reel hub openings 326 and the winding ribbon will force the actuator 312 to shift counterclockwise against the urging of its bias spring 320.

Figure 14:
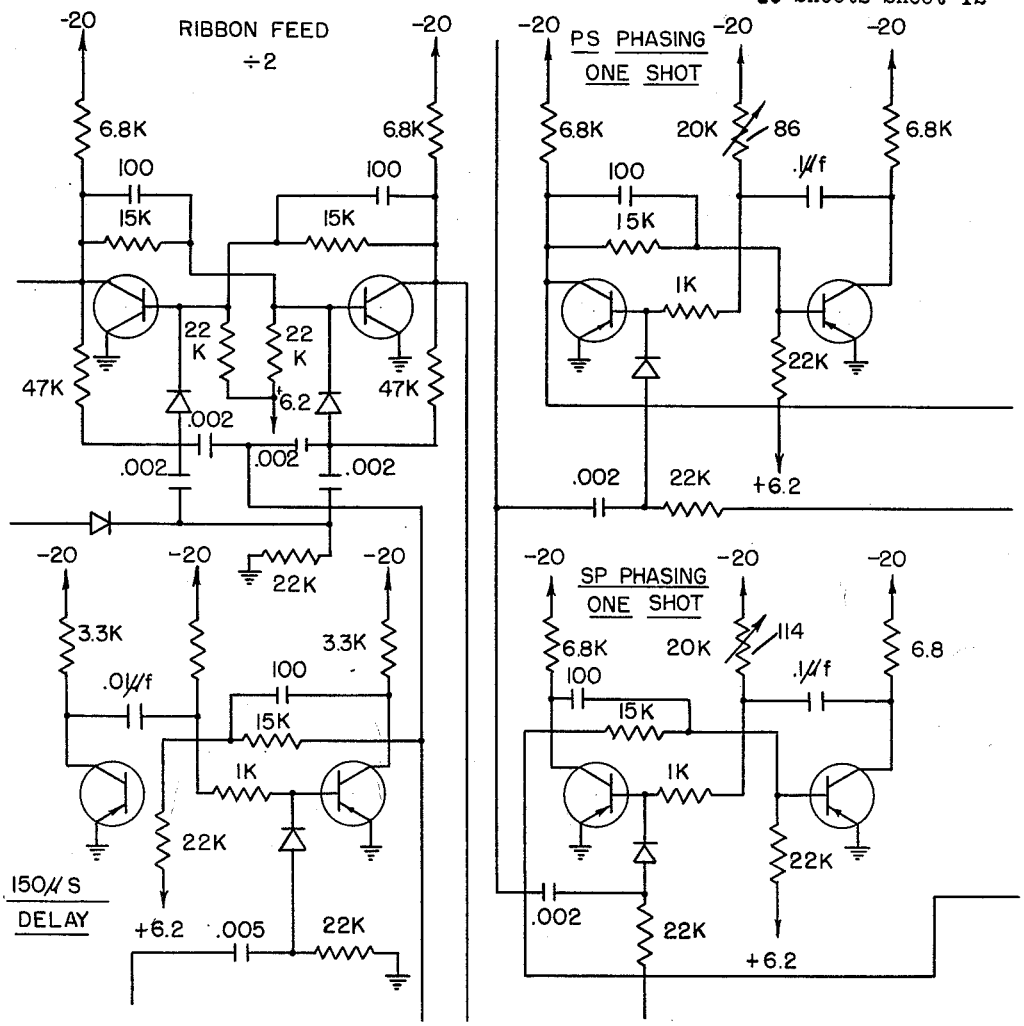
Figure 14A:
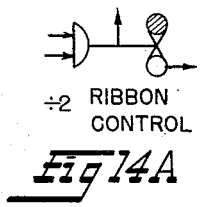
Figure 14B:
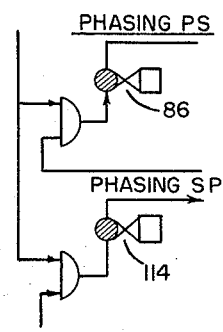

In the operation of the ink ribbon mechanism, a ribbon feed indexing step will occur once for each two times the control circuit feeds a signal to the ribbon feed divide-by-two register 58 (FIGURES 1 and 14). As has been described, once during a cycle of any of the four operative modes, a signal pulse is fed to the ribbon feed divide-by-two register 58 which controls a ribbon feed one-shot (14 ms.) 60 (see FIGURES 1 and 12) to momentarily energize the ribbon feed solenoid 64. In FIGURE 5, whenever ribbon feed solenoid 64 is momentarily energized, the plunger 236 reciprocates forward against the bias of spring 238 and returns back under spring force. Forward movement of plunger 236 indexes the ribbon drive shaft one step by means of linkage 242, 244, 248, pawl 252 and ratchet wheel 256. A detent 262 bears on the ratchet wheel teeth to assure single step indexing by the pawl 252. The ratchet 256 being fixed to shaft 258 causes shaft 258 to rotate clockwise one step to rotate two small gears 274 and 276 attached to ends of the shaft. One or the other of gears 274 and 276 is meshed with an associated large gear 278 or 280 and rotates that gear. As illustrated in FIGURE 5, gears 274 and 278 are meshed, so gear 278, its spindle 270 and the ink ribbon reel 282 carried by the spindle are rotated to wind-up the ink ribbon in indexed steps, the ink ribbon being removed from the other reel 284. Thus, each time the solenoid 64 is energized the ink ribbon 230 is advanced a slight distance until one of the two ink ribbon reels 282 and 284 is almost emptied.

Figure 6:
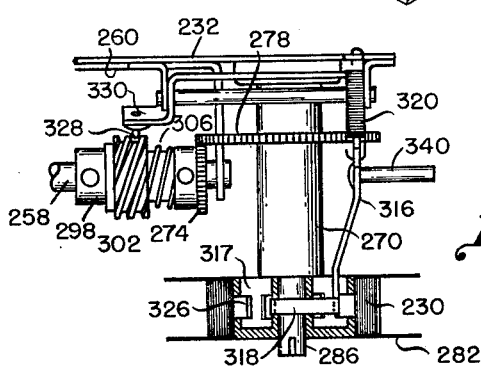
FIGURE 6 is a detailed partially sectioned view of the right-hand mechanism of the ink ribbon feed and reverse apparatus of FIGURE 4.
Figure 12:
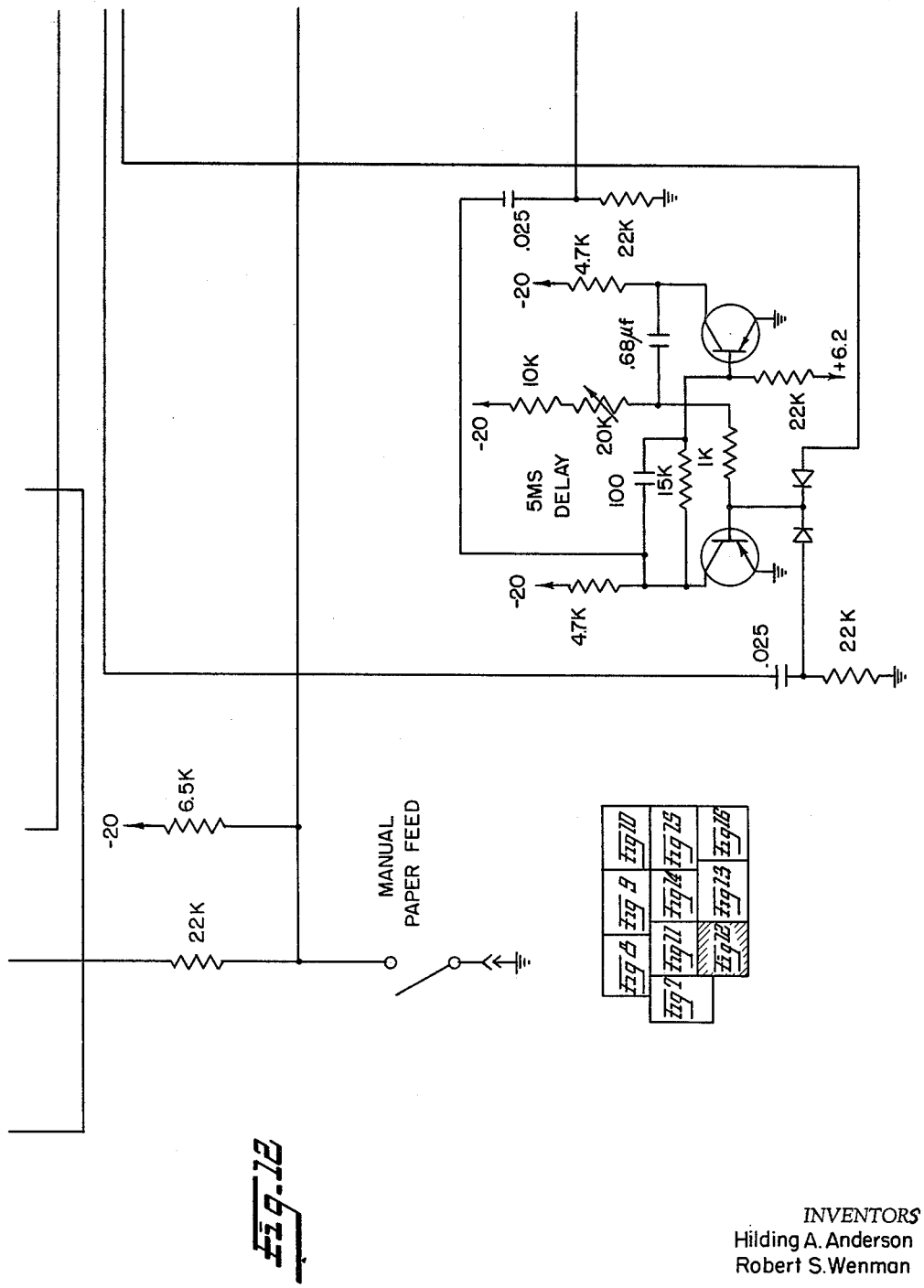

The sensing levers 316 and 316' are employed to activate the ribbon reversing mechanism as seen in FIGURES 4–6. In order to load the ink ribbon spindles 270 and 272, sensing levers 316 and 316' must be moved downward, as viewed in FIGURE 5, by depressing manual operating rods 340 and 342. This enables ink ribbon reels 282 and 284 to be slipped onto spindle ends 286 and 288 with the curved fingers 318 and 318' of sensing levers 316 and 316' fitting inside the hollow hub 317 of each ink ribbon reel (FIGURE 6). As the ink ribbon 230 completely unwinds from one ink ribbon reel, the curved finger end 318 or 318' of lever 316 or 316' (until now, blocked by the ink ribbon wound on the reel) is now unblocked and moves upward into an opening 326 on the inside rim of the ink ribbon reel hub 317 (see FIGURE 6). This enables a shift of sensing lever 316 or 316' under bias of spring 320 until the pin 328 or 328' on short arm 330 moves into engagement with the threads of worm gear 302 or 304. If gear 302 has its threads engaged by sensing lever shift pin 328, clockwise rotation of the gear by shaft 258 will cause the shaft assembly to shift toward the right until gears 274 and 278 are in mesh (FIGURE 4) causing shaft 258 to drive spindle 270 and its ribbon reel 282. Positive drive rotation of the ribbon reel will wind the ink ribbon on that reel and, through the sensing lever 316, will remove the reversing pin 328 from the threads of gear 302. Gears 274 and 278 will continue to rotate the reel 282 until reel 284 is empty, at which time its sensing lever 316 will be raised to place its pin 328 into the worm threads of gear 304 to shift the drive shaft assembly to the left, meshing gears 276 and 280, and place positive drive on reel 284 instead of reel 282.

To make certain that shaft 258 remains in one or the other position until a shift movement is desired, a spring loaded detent pin 344 engages alternate ones of two side by side grooves 346 and 348 in the sleeve 296 of the left-hand small gear unit on the ribbon drive shaft 258. When the shaft assembly is shifted one way or the other to reverse the ribbon feed, one of the grooves 346 or 348 moves laterally away from the detent pin 344 which is then depressed by ridge 350 between the grooves, and the detent pin is then biased into the other groove to hold the drive shaft assembly in such position until the ink ribbon is again reversed.

The foregoing portion of the specification constitutes a full description of the mechanical structure and control circuit of a new electronic high speed serial tape printer. The mechanism includes a novel dual character row typewheel with independent hammers for each character row and a new form of tape feed. The electronic control provides high speed operation by selecting a desired one of two distinct modes of timed, correlated operation between a print hammer and tape feed to result in clean, even, legible and serially printed messages on the tape at approximately 30 characters per second. The rate of speed is limited by the time required for stepped movement of mechanical components of the tape feed mechanism. The printer utilizes dual tape stepping assemblies, each of which is alternately operated as a result of sequential machine operational cycles corresponding to each received strobe pulse. A novel manual tape circuit is described which steps the tape once every thirty milliseconds, as distinguished from signal controlled tape stepping which occurs at a rate averaging once every 33⅓ milliseconds or 30 times each second.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A high speed printer comprising: a double row indicia carrier means continuously operable to repetitively move a plurality of sets of different indicia in sequential order of sets past a print station; a print means for each one of said rows at said print station adapted to be selectively independently actuated in time relationship to movement of said indicia sets and in accord with the row in which a desired indicia appears to accomplish a printing operation of a selected indicia; a strip record medium passing in a path transverse to the movement of said indicia carrier means between said print means and said indicia carrier means; means to feed said record medium along said path; control means responsive to received code signal combinations to select and print any indicia, corresponding to the received code signal combination, during the movement of that indicia on said carrier means past said print station; means correlated with said control means to actuate said feed means in a selected one of plural predetermined time relationships relative to operation of said print means depending upon the row in which said desired indicia appears; and means including a time delay for inhibiting printing of a selected indicia if that indicia moves past said print station within said time delay period and providing delayed selection and printing of the desired indicia during a repetitive passage of the plurality of indicia on said type carrier past said print station.

2. A printer as defined in claim 1, wherein said indicia carrier is a dual row rotary typewheel, and said print means includes a common ink ribbon passing tangent to said typewheel and automatic ribbon feed and reverse mechanism with an electrical solenoid step operated power means responsive to machine cycles.

3. A printer as defined in claim 2, wherein said means responsive to received code signal combinations includes a cascaded binary counter in which a received code group jams the counter to a pre-set count representative of a desired indicia; electronic typewheel position detection means provides index control pulses representing start positions of indicia groups and indicia position impulse counts; a device responsive to a received synchronization signal permits an index pulse from said detection means to gate position impulses, subsequent to said index pulse, to the input of said counter to complete any pre-set count by sequential count values which represent the number of positions of the indicia past an indexing position; means responsive to completion of a count by said counter provides a control impulse signal for initiating actuation of the printing means associated with the appropriate row at the exact rotational position to cause printing of the desired indicia and also for initiating actuation of said feed means; and the inhibiting means, which when an impulse signal is inhibited, provides delayed selection and printing, permits said counter to continue receiving position impulses to provide a complete count starting from the non-printed indicia position, and at completion of a full count the counter output provides a second control impulse signal to cause printing of the desired indicia on the record medium.

4. A high speed printer comprising: indicia carrier means to repetitively move a plurality of indicia in sequential order past a print station; print means at said print station adapted to be selectively actuated in timed relationship to movement of said indicia to provide a printing operation of a selected indicia; a strip record medium passing in a path transverse to the movement of said indicia carrier means between said print means and said indicia carrier means; means to feed said record medium along said path; control means responsive to received code signal combinations to select and print any indicia corresponding to the received code signal combination as that indicia passes said print station in its movement by said carrier; means correlated with said control means to actuate said feed means in predetermined timed relationship to operation of said print means; and means included in said control means, including a time delay device, for inhibiting printing of a selected indicia for a predetermined time period after receipt of a code signal combination if an indicia corresponding to said received code signal combination moves past said print station within said predetermined time delay period and upon occurrence of such a print inhibition providing delayed selection and printing of the desired indicia during a successive passage of the desired plurality of indicia on said type carrier past said print station.

5. A printer as defined in claim 4, wherein said means to feed said record medium includes at least two independently operable tape feed operators and said control means includes a switching device to automatically alternate actuation of said feed operators.

6. A printer as defined in claim 4, wherein said indicia carrier is a rotary typewheel.

7. A printer as defined in claim 6, wherein said means responsive to received code signal combinations, includes a cascaded binary counter, enables a code group within a received code signal combination to jam the counter to a pre-set count representative of a desired indicia in accord with the received code signal combination; an electronic typewheel position detection means enables group index control pulses representative of an indicia type group starting to move past a position detection control point and enables indicia position impulse counts representative of indicia type moving past an indicia position control point; a control device receives a synchronization signal and operatively enables the succeeding index pulse from said detection means to gate the position impulses, subsequent to said index pulse, to the input of said counter to complete the pre-set count by sequential count values which represent the number of indicia positions between an index position and the position of the desired indicia on said typewheel; means responsive to completion of a count by said counter provides a control impulse signal for actuating the printing of the proper indicia and for actuation of said feed means; and the inhibiting means, which when an impulse signal is inhibited, provides delayed selection and printing, permits said counter to continue receiving impulse position counts, starting from the non-printed indicia position, until a full count passes through the counter, at which time the counter output provides a second impulse signal to cause printing of the desired indicia on the record medium.

8. A printer as defined in claim 7, wherein said rotary typewheel indicia carrier has at least two distinct groups of identically sequentially arranged indicia type in a circumferential row, and said electronic typewheel position detection means includes means to provide an index pulse as each group starts past a distinct position detection control point.

9. A printer for serially printing information on a strip record medium comprising: a double row typewheel; means for feeding a strip record medium adjacent said typewheel periphery in a direction parallel to the axis of said typewheel; each typewheel row having print characters circumferentially spaced around its periphery; means for printing from either row on said strip record medium; and control means having means for receiving a coded message and, in accord therewith, selecting and actuating either a printing, then strip record feeding mode of operation or laternately, a strip record feeding and then a printing mode of operation, the selected mode of correlated printing and feeding operations depending upon the typewheel row from which the character is to be printed.

10. A serial printer as defined in claim 9, wherein said strip record medium feeding means comprises: a record strip engaging roller; a rotary shaft carrying and driving said roller; a plurality of similar feeding mechanisms operatively connected to impart identical drive moments to said shaft; and said means for actuating a record feed operation includes a switching device which automatically alternately selects a different one of said feed mechanisms for successive feed operations.

11. A printer as defined in claim 9, wherein said printing means includes: an ink ribbon feeding and reversing assembly with an ink ribbon passing adjacent the print positions of said typewheel and said record medium; an electronic power circuit to step feed said ink ribbon assembly; and an electronic divide-by-two register included in said control means with a single output to provide an actuation signal to trigger operation of said electronic power circuit.

12. A printer as defined in claim 9, wherein a space—no print control means is connected to said control means and exerts an inhibition control over said means for receiving coded messages and selecting and actuating the printing and feeding operations upon receipt of a "space" code signal, and emits an auxiliary control signal to actuate said record medium feed means.

13. A rotary typewheel printer for serially printing data on a strip record medium comprising: a print station; a rotary typewheel with two parallel circumferential rows including a group of individual character printing indicia in each row disposed at circumferential positions around the peripheries of said rows, said typewheel moving said printing indicia in both rows past said print station; two selectively operable print hammer means, one associated with each row of printing indicia, arranged in tandem at said print station and including operator means and hammers connected thereto and reciprocally mounted for shifting movement along a path substantially radial relative to the axis of rotation of said typewheel for accomplishing recording of any selected indicia on a typewheel row associated with said hammer; means including operator means for feeding a strip record medium between said print hammers and said typewheel at said print hammer operator means; actuating means for said record feed operator means; control means for said print hammer actuating means and for said record feed actuating means adapted to receive electrical message data code combination signals which include desired indicia code combination signals and special information data representative of one or the other typewheel row and providing a control signal when an indicia on said typewheel corresponding to the character represented by a received code combination signal is in print position at said print station; means included in said control means responsive to said special information data correlating said control signal with the appropriate print hammer actuating means associated with the row corresponding to received information data and with the record feed actuating means to provide one of two modes of sequential operation between the means for feeding said strip record medium and operation of the desired one of said print hammers, one of said modes of operation calling for a printing operation by one of said print hammer means and then a strip record medium feeding operation and the other of said modes of operation calling for a strip record feeding operation and then a printing operation by the second of said print hammer means.

14. A rotary typewheel printer for serially printing data on a strip record medium comprising: a print station; a rotary typewheel with two parallel circumferential rows including a group of individual character printing indicia in each row disposed at circumferential positions around the peripheries of said rows, said typewheel moving said printing indicia in both rows past said print station; two selectively operable print hammer means, one associated with each row of printing indicia, arranged in tandem at said print station and including hammers reciprocally mounted for shifting movement along a path substantially radial relative to the axis of rotation of said typewheel for accomplishing recording of any selected indicia on a typewheel row associated with said hammer; means for feeding a strip record medium between said print hammers and said typewheel at said print station in a direction parallel to the axis of said typewheel; typewheel position detection means having clock portions rotating with said typewheel providing electrical indexing and printing indicia position representative pulses during rotation of said typewheel; power means for rotating said typewheel and said clock portions of said detection means; independent actuating means for each of said print hammer means; actuating means for said record feed means; control means for said print hammer actuating means and for said record feed actuating means adapted to receive electrical message data code combination signals which include desired indicia code combination signals and special information data representative of two distinct groups of indicia, one group of which corresponds to said group of character printing indicia on one of said typewheel rows and the other group of which corresponds to said group of character printing indicia on the other of said typewheel rows; comparator means included in said control means responsive to receipt of said indexing and position pulses from said typewheel position detection means for determining and providing a control signal when an indicia on said typewheel corresponding to the indicia represented by a received code combination signal is in print position at said print station; means also included in said control means responsive to said special information data correlating said control signal from said comparing device with the print hammer actuating means and the record feed actuating means to provide one of two modes of correlated operation between the means for feeding said strip record medium and operation of a desired one of said print hammers corresponding to the row in which said desired indicia appears, one of said modes of operation calling for a printing operation by one of said print hammer means and then a subsequent strip record feeding operation and the other of said modes of operation calling for a strip record feeding operation and then a subsequent printing operation by the second of said print hammer means.

15. A serial printer as defined in claim 14, wherein said medium feeding means comprises at least two similar feeding mechanisms and a common record medium engaging means operable by each said feeding mechanism, each of said feeding mechanisms being independently capable of being operated to step the record medium one character space for each cycle of printer operation; said operating means for said feed means comprises an independent power operator for each feed mechanism; and said control means includes means which directs successive feed actuation signals alternately to said two independent operators.

16. A serial printer as defined in claim 14, wherein said control means includes: means connected to said comparator and to receive an input stroboscopic synchronization signal at the start of each code combination signal time period to correlate the presence or absence of receipt of a received code combination signal in the comparator with the corresponding synchronization signal to automatically selectively permit or inhibit the start of a comparing function in said comparator thereby permitting or inhibiting the resultant output of actuation control signals from said comparator to said printing and spacing operating means; a gated switching circuit conditioned by said inhibiting means when code comparing and actuation control signals are inhibited to concurrently impart an auxiliary actuation control signal, responsive to a synchronization signal, into said record medium feed actuating means to thereby enable a step feed of said strip record medium.

17. A printer as defined in claim 14, wherein each group of indicia included in each of said two typewheel rows is repeated in said typewheel rows at 180° diametrical phase positions on said typewheel; said detection means has devices to provide an indexing pulse at two 180° positions of rotation of said typewheel; said control means includes an inhibiting device which blocks the comparator control signal for a predetermined time period subsequent to an index pulse to permit any requisite mechanical function to occur prior to actuation of a printing operation; said control means also including a device enabled upon emission of the comparator control signal at any time during the said inhibited period to permit continued receipt by said comparator of a number of typewheel position pulses corresponding to an additional 180° rotation of said typewheel whereby the comparator output provides a second actuation control signal resulting in appropriately timed print hammer operation to print the required indicia 180° out of phase from the same typewheel indicia which was in print position at the time of the inhibited first control signal from the comparator.

18. An electronically controlled high speed printer comprising: a rotary typewheel containing multiple specific information indicia and a plurality of type faces for each specific indicia to be printed at a printing station, the plurality of type faces for each specific indicia individually moving into printing position at said printing station for a limited interval of time at predetermined phase intervals equal to 360° divided by a number equal to said plurality of type faces; means for sensing the specific indicia represented by the type face approching printing position and for generating a sequential electrical impulse code representation of that character; a control unit comprising circuit means for receiving simultaneous groups of electrical impulses representative of characters to be printed; means receiving said sequential position detection and connected to said circuit means for determining the coincidence of a desired indicia to be printed and the approach of a corresponding type face into printing position at said printing station and for causing the imprinting of that indicia on an appropriate record receiving medium; and means to inhibit imprinting of such selected indicia prior to a predetermined time lapse from start of receipt of a group of position detection impulses and enabling imprinting of an identical indicia from the next phase interval representation of that same indicia on said typewheel.

19. A high speed printer comprising: a continuously rotating print wheel having a plurality of indicia spaced in circumferential disposition around its periphery, each indicia being repeated in 180° out of phase positions; a hammer device for forcing a record medium toward a selected one of said indicia when actuated to accomplish printing operations; means for actuating said hammer device; means for controlling said actuating means comprising a typewheel position detection means generating electrical pulses in a line connected thereto, the timing of the pulses being substantially identical with the timing of the movement of said indicia relative to said hammer; a pulse actuated counter, having an input circuit and an output circuit, for counting to a predetermined total count equal to the number of positions in each 180° rotation of said print wheel, and then producing a control pulse at its output; said input circuit including said line; synchronizing means for producing a gate in said input circuit to permit the delivery of said position pulses through said line to said counter; circuit means energized by an uninhibited output pulse from said counter for delivering an actuating pulse to said actuating means; and a time delay means connected to said counter output for inhibiting passage of an end-of-count output pulse from said counter to said circuit means if such output pulse occurs prior to the time lapse of said time delay means and concurrently permitting continued delivery of said indicia position generated sequential pulses to said counter input circuit during a subsequent 180° rotation of said print wheel which provides introduction of pulses, equal to a complete count, into the counter resulting in a second but uninhibited output control pulse from said counter.

20. A printing device including a substantially continuously rotating typewheel having indicia spaced thereupon and a hammer for forcing a record medium toward a selected one of said indicia when actuated to accomplish printing operations; means for actuating said hammer; means for feeding said record medium; means for controlling said actuating means and said feeding means comprising an electrical typewheel position detection device to generate a succession of pulses, the timing thereof being identical with the timing of the movement of said indicia relative to said hammer; said controlling means including a circuit switching device having a conducting condition and a non-conducting condition and means dependent upon said pulses for varying the conductivity of said switch device thereby to operate said actuating means and said feeding means; means responsive to a predetermined signal condition to inhibit said controlling means and provide an auxiliary electrical control pulse; and a by-pass circuit receiving said auxiliary electrical control pulse and directing it to actuate said record medium feeding means.

21. An electronic high speed printer comprising: a continuously rotating typewheel having a plurality of peripheral rows of indicia type faces with adjacent type faces in successive rows arranged in approximate longitudinal alignment on said typewheel; a separate print hammer associated with each of the peripheral rows of type, all print hammers being disposed in tandem; means for feeding a record medium transverse to the typewheel and between said hammers and said rows of type indicia; a counter circuit; code signal receiving means feeding a code combination signal, representative of an indicia on said typewheel to be printed, into said counter circuit; said control means including means for receiving a synchronization pulse to initiate a control cycle; pulse generator means to produce an indexing pulse and a series of sequential pulses corresponding to positions of adjacent type indicia on the typewheel as they pass adjacent said print hammers; means operatively associated with said control means to operate the print hammers under control of said control means; said control means including means for feeding said counted pulses from said generator means into said counter circuit to provide, with the said received code combination signal, a complete predetermined count; means responsive to completion of a count in said counter to provide actuation of said print hammer operating means and said record medium feed means; and means responsive to a received information signal in said code combination signal to permit actuation of only the one of said print hammers which is associated with the typewheel row from which the character corresponding to said received code combination signal is to be printed, whereby each mechanical cycle of the printer under control of the counter output accomplishes one printing operation and one feeding operation.

22. The combination was claimed in claim 21, wherein said control means includes gating means responsive to coincidental receipt of a synchronization signal and the absence of an associated positive code combination signal to block normal passage of a synchronization signal to said control means and thereby inhibit operation of said counter circuit and simultaneously provide an auxiliary control signal; and by-pass circuit means to apply said auxiliary control signal to said record medium feed operating means, whereby record medium feeding operations can be accomplished in response to received synchronizing signals and an effective code combination signal representative of a "space" in a message being received.

23. The combination as claimed in claim 21, wherein a manual control circuit for record medium feeding is provided and includes: a manual switch; a manual feed "and" gate; a conditioning circuit to an input of said "and" gate including said switch; a branch circuit from said pulse generator means to impose said index pulses on a second input to said "and" gate; an output from said "and" gate connected to actuate said record medium feed operating means; and said "and" gate being constructed to pass said index pulses upon being conditioned by manual operation of said switch.

24. An electronic control for a continuously rotating rotary typewheel printer having a dual row typewheel, two serial printing means, one for each row and a strip record medium feed means, said electronic control comprising: electronic switching means to generate an electrical pulse at an appropriate typewheel rotational position, at which position a selected indicia is present to be printed, and imparting said pulse to the input side of two "and" gates, the outputs of which control actuation of respective individual ones of said printing means; a circuit also directing said electrical pulse to a record feed control "and" gate, the output of which controls said strip record feed means; a second electronic switching means having two alternately energized output circuits, one being a normal "set" condition circuit, and the other a "reset" condition circuit, and an information input adapted to be pulsed when a selected indicia to be printed is in a specific one of said two rows to thereby switch from said normal "set" output circuit to the "reset" output circuit; said "set" output circuit being connected to condition one of said printing means "and" gates controlling actuation of the printing means of the other of said typewheel rows and also conditioning said record medium feed "and" gate, the "reset" output circuit conditioning the other of said printing means "and" gates controlling actuation of the said printing means for said specific one row and by-passing said record medium feed "and" gate to directly actuate said record medium feed means; and electronic delay means preventing passage of said electrical pulse for at least a predetermined time lapse to thereby permit completion of record medium feed operation by direct control when said second electronic switching means is in reset condition.

25. Means for determining the instantaneous position of any adjacent set of a group of sequential adjacent sets of plural information representative means around the periphery of a rotatable member and selecting one of said information representative means in said determined set comprising: a rotating element coaxial with said member; means for generating a continuous series of sequential signals corresponding to the positions of said sets during the entire rotation of said element; a reference point; a counter device; means to pre-set the counter in accord with a received simultaneous code combination signal representative of a selected information representative means; means cooperating with said rotating element for generating an indexing pulse as said element passes said reference point; means actuated by said indexing pulse for enabling sequential input of said continuous series of signals to said counter; output means in said counter, responsive to a predetermined correlation between its pre-set condition and a number of sequential position pulses representing the desired position of the set of plural information on the rotatable member, to pass a read-out signal; and means responsive to predetermined information data received with said code combination signal to direct said counter read-out signal to provide read-out from said rotatable member only of the one of said plural information representative means in said selected set which corresponds to the received code combination signal.

26. A printer for serially printing information on a strip record medium comprising: a double row axially fixed typewheel; means for step feeding a strip record medium adjacent said typewheel periphery in a direction parallel to the axis of said typewheel; two independent means for printing from respective typewheel rows onto said strip record medium; cyclic control means selectively actuating one of said printing means and then actuating said strip record feeding means or alternately actuating said strip record feeding means and then actuating the other of said printing means.

27. A high speed printer comprising: indicia carrier means to repetitively move a plurality of indicia in sequential order past a print station; print means at said print station adapted to be selectively actuated in timed relationship to movement of said indicia to provide a printing operation of a selected indicia; control means responsive to received code signal combinations to select and print any indicia corresponding to the received code signal combinations by actuation of said print means as that indicia passes said print station in its movement by said carrier; and adjustable phasing means in said control means to vary the actuation period of said print means relative to the timed passage of its associated indicia past a print station to assure proper timed actuation of said print means for relative cooperation between the print means and the selected indicia to accomplish complete accurate reproduction of that indicia.

28. In a high speed printer as defined in claim 27, said adjustable phasing means comprising an adjustable time delay circuit for producing a time delayed actuation of said print means by said control means.

29. A high speed printer comprising: indicia carrier means to repetitively move a plurality of indicia in sequential order past a print station; print means at said print station adapted to be selectively actuated in timed relationship to movement of said indicia to provide a printing operation of a selected indicia; a strip record medium passing in a path transverse to the movement of said indicia carrier means between said print means and said indicia carrier means; means to feed said record medium along said path; control means responsive to received code signal combinations to select and print any indicia corresponding to the received code signal combinations by actuation of said print means as that indicia passes said print station in its movement by said carrier; adjustable phasing means in said control means to vary the actuation period of said print means relative to the timed passage of its associated indicia past a print station to assure proper timed actuation of said print means for relative cooperation between the print means and the selected indicia to accomplish complete accurate reproduction of that indicia; and means correlated with said control means to actuate said feed means in predetermined timed relationship to operation of said print means.

30. A high speed printer comprising: a double row indicia carrier means continuously operable to repetitively move a plurality of sets of different indicia in sequential order of sets past a print station; a print means for each one of said rows at said print station adapted to be selectively independently actuated in timed relationship to movement of said indicia sets and in accord with the row in which a desired indicia appears to accomplish a printing operation of a selected indicia; a strip record medium passing in a path transverse to the movement of said indicia carrier means between said print means and said indicia carrier means; means to feed said record medium along said path; control means responsive to received code signal combinations to select and print any indicia, corresponding to the received code signal combinations, during the movement of that indicia on said carrier means past said print station; means correlated with said control means to actuate said feed means in a selected one of plural predetermined timed relationships relative to operation of said print means depending upon the row in which said desired indicia appears; and adjustable electronic phasing means to vary the actuation period of each print means relative to the timed passage of its associated indicia past a print station.

31. A high speed printer comprising: a double row indicia carrier means continuously operable to repetitively move a plurality of sets of different indicia in sequential order of sets past a print station; a print means for each one of said rows at said print station adapted to be selectively independently actuated in timed relationship to movement of said indicia sets and in accord with the row in which a desired indicia appears to accomplish a printing operation of a selected indicia; control means responsive to received code signal combinations to select and print any indicia, corresponding to the received code signal combinations, during the movement of that indicia on said carrier means past said print station; and adjustable electronic phasing means to vary the actuation period of each print means relative to the timed passage of its associated indicia past a print station.

32. In a serial printer as defined in claim 9, said printing means including: a tandem set of two low mass reciprocable print hammers, each of which is spring biased to a retract position; a separate power operator for each print hammer including a shiftable member, one portion of which connects to its associated print hammer, and a power means to shift said shiftable member and thereby reciprocate the associated print hammer against spring bias; and said control means includes electronic means to selectively direct a momentary current shot to energize one or the other of said operator solenoids in accord with the selected mode of correlated printing and feeding operations.

33. In a serial printer as defined in claim 9, said printing means including: a set of two reciprocable print hammers arranged in tandem alignment relative to the serial printing operation of said printer, each of which hammers is spring biased to a retract position; a separate power operator for each print hammer including a shiftable member, one portion of which connects to its associated print hammer and a power means to shift said shiftable member and thereby reciprocate the associated print hammer against spring bias; and said control means selectively operate one or the other of said power means.

References Cited in the file of this patent

UNITED STATES PATENTS

| | | |
|---|---|---|
| 1,054,582 | Marchthal | Feb. 25, 1913 |
| 2,079,337 | Roe et al. | May 4, 1937 |
| 2,724,332 | Schlessiger et al. | Nov. 22, 1955 |
| 2,757,605 | Dumey | Aug. 7, 1956 |

(Other references on following page)

UNITED STATES PATENTS

| | | |
|---|---|---|
| 2,776,618 | Hartley | Jan. 8, 1957 |
| 2,787,210 | Shepard | Apr. 7, 1957 |
| 2,787,952 | Roche | Apr. 9, 1957 |
| 2,821,918 | Llorens | Feb. 4, 1958 |
| 2,831,424 | MacDonald | Apr. 22, 1958 |
| 2,831,561 | Speh | Apr. 22, 1958 |
| 2,863,549 | Kelly | Dec. 9, 1958 |
| 2,869,457 | Paige | Jan. 20, 1959 |
| 2,874,634 | Hense | Feb. 24, 1959 |
| 2,897,752 | Malmros et al. | Aug. 4, 1959 |
| 2,928,896 | Dirks | Mar. 15, 1960 |
| 2,945,187 | McCollom | Jan. 12, 1960 |
| 2,955,171 | Raper | Oct. 4, 1960 |
| 2,983,356 | Thompson | May 9, 1961 |
| 2,990,767 | Demer et al. | July 4, 1961 |
| 3,012,499 | Amada | Dec. 12, 1961 |

UNITED STATES PATENT OFFICE
CERTIFICATE OF CORRECTION

Patent No. 3,131,627　　　　　　　　　　　　May 5, 1964

Hilding A. Anderson et al.

It is hereby certified that error appears in the above numbered patent requiring correction and that the said Letters Patent should read as corrected below.

Column 7, line 47, for "so" read -- no --; column 20, line 25, for "laternately" read -- alternately --.

Signed and sealed this 15th day of September 1964.

(SEAL)
Attest:

ERNEST W. SWIDER
Attesting Officer

EDWARD J. BRENNER
Commissioner of Patents